US011022464B2

(12) United States Patent
Friedrich et al.

(10) Patent No.: US 11,022,464 B2
(45) Date of Patent: Jun. 1, 2021

(54) BACK-BIASED MAGNETIC FIELD SENSOR HAVING ONE OR MORE MAGNETORESISTANCE ELEMENTS

(71) Applicant: Allegro MicroSystems, LLC, Manchester, NH (US)

(72) Inventors: Andreas P. Friedrich, Metz-Tessy (FR); Marie-Adelaide Lo, Chene-Bougeries (CH); Andrea Foletto, Andorno Micca (IT); Nicolas Yoakim, Morges (CH)

(73) Assignee: Allegro MicroSystems, LLC, Manchester, NH (US)

( * ) Notice: Subject to any disclaimer, the term of this patent is extended or adjusted under 35 U.S.C. 154(b) by 268 days.

(21) Appl. No.: 16/157,130

(22) Filed: Oct. 11, 2018

(65) Prior Publication Data
US 2020/0116525 A1    Apr. 16, 2020

(51) Int. Cl.
*G01D 5/16* (2006.01)
*G01D 5/14* (2006.01)

(52) U.S. Cl.
CPC ............... *G01D 5/16* (2013.01); *G01D 5/145* (2013.01)

(58) Field of Classification Search
CPC .......... G01D 5/145; G01D 5/16; G01D 5/147; G01P 3/487; G01B 7/30; G01B 7/003
See application file for complete search history.

(56) References Cited

U.S. PATENT DOCUMENTS

| | | | |
|---|---|---|---|
| 6,278,269 B1 | 8/2001 | Vig et al. | |
| 6,452,381 B1 | 9/2002 | Nakatani et al. | |
| 6,525,531 B2 | 2/2003 | Forrest et al. | |
| 7,269,992 B2 | 9/2007 | Lamb et al. | |
| 7,285,952 B1 | 10/2007 | Hatanaka et al. | |
| 7,355,388 B2 | 4/2008 | Ishio | |
| 7,368,904 B2 | 5/2008 | Scheller et al. | |
| 7,816,772 B2 | 10/2010 | Engel et al. | |
| 9,810,519 B2 | 11/2017 | Taylor et al. | |
| 9,823,092 B2 | 11/2017 | David et al. | |
| 2016/0123771 A1* | 5/2016 | David ................... | G01D 5/145 324/207.2 |
| 2016/0169984 A1* | 6/2016 | Werth .................... | G01R 33/09 324/244 |
| 2017/0314907 A1 | 11/2017 | Taylor et al. | |

OTHER PUBLICATIONS

Continental, "Sensor Principles for Motion Detection of Gears"; Plankhorn, TCO RD, Nov. 13, 2008, © Continental AG; 15 pages.
Integrated GMR based Wheel Speed Sensor for Automotive Applications, Kapser et al., IEEE Sensors 2007 Conference; I-4244-1262-5/07; 4 pages.

* cited by examiner

*Primary Examiner* — Jermele M Hollington
*Assistant Examiner* — Suresh K Rajaputra
(74) *Attorney, Agent, or Firm* — Daly, Crowley, Mofford & Durkee, LLP

(57) ABSTRACT

A magnetic field sensor includes one or more magnetic field sensing elements and a back-biased magnet arranged to avoid saturation of the one or more magnetic field sensing elements, particularly when the one or more magnetic field sensing elements comprise one or more magnetoresistance elements. The one or more magnetoresistance elements can be arranged in a resistor bridge.

32 Claims, 11 Drawing Sheets been # BACK-BIASED MAGNETIC FIELD SENSOR HAVING ONE OR MORE MAGNETORESISTANCE ELEMENTS

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic field sensors, and, more particularly, to back-biased magnetic field sensors having a magnet and a substrate with one or more magnetic field sensing elements thereupon, all arranged in a variety of relative positions.

BACKGROUND

Various types of magnetic field sensing elements are known, including Hall Effect elements and magnetoresistance elements. Magnetic field sensors generally include one or more magnetic field sensing elements and other electronic components. Some magnetic field sensors also include a permanent magnet in a so-called "back-biased" arrangement described more fully below.

Magnetic field sensing elements responsive to magnetic fields have a variety of different types. A Hall effect element is a type of magnetic field sensing element known to have a relatively low sensitivity to magnetic fields. The Hall effect element tends to operate over a relatively wide range of magnetic fields without magnetic field saturation of the Hall effect element. In contrast, some types of magnetoresistance element are known to have a relatively high sensitivity to magnetic fields. The magnetoresistance element tends to operate over a relatively narrow range of magnetic fields and saturates at larger magnetic fields.

The magnetoresistance element also tends to provide a higher signal to noise ratio than a Hall effect element.

Magnetic field sensors provide an electrical signal representative of a sensed magnetic field. In some embodiments that have the above-described back-biased arrangement, the sensed magnetic field is a magnetic field generated by the magnet, in which case, in the presence of a moving ferromagnetic object, the magnetic field generated by the magnet and sensed by the magnetic field sensor varies, i.e., varies in amplitude and/or angle, in accordance with a shape or profile of the moving ferromagnetic object.

Magnetic field sensors are often used to detect movement of features of a ferromagnetic gear, such as gear teeth and/or gear slots or valleys. A magnetic field sensor in this application is commonly referred to as a "gear tooth" sensor.

In some arrangements, the gear is placed upon a target object, for example, a camshaft in an engine. Thus, it is the rotation of the target object (e.g., camshaft) that is sensed by detection of the moving features of the gear. Gear tooth sensors are used, for example, in automotive applications to provide information to an engine control processor for ignition timing control, fuel management, anti-lock braking systems, wheel speed sensors, and other operations.

Information provided by the gear tooth sensor to the engine control processor can include, but is not limited to, an absolute angle of rotation of a target object (e.g., a camshaft) as it rotates, a speed of the rotation, and a direction of the rotation. With this information, the engine control processor can adjust the timing of firing of the ignition system and the timing of fuel injection by the fuel injection system.

Some back-biased magnetic field sensors include a relatively complex magnet in order to provide a low so-called "baseline." The baseline is the lowest magnetic field experienced by the magnetic field sensor as a target object moves. To this end, some relatively complex magnets employ a special core material. An exemplary magnet with a core is described in U.S. Pat. No. 6,278,269, entitled "Magnet Structure," issued Aug. 21, 2001, which patent is assigned to the assignee of the present invention and incorporated herein by reference in its entirety.

A low baseline, which can occur, for example, when the magnetic field sensor is proximate to a gear valley, results in an enhanced ability of the magnetic field sensor differentiate the presence of a gear tooth from a gear valley.

Some back-biased magnetic field sensors use magnets that are less complex. For example, U.S. patent application Ser. No. 13/946,380, filed Jul. 19, 2013 and U.S. patent application Ser. No. 14/529,669, filed Oct. 31, 2014 both describe back-biased magnetic field sensors that use back-biased magnets that can be rectangular in shape and that have no core. Both of these applications are incorporated by reference herein in their entirety.

A back-biased magnetic field sensor that uses a magnetoresistance element has special considerations. In particular, the magnetoresistance element can be saturated by the back-biased magnet, and therefore, be rendered inoperative.

The conventional magnetic field sensor must achieve an accurate output signal that accurately differentiates between gear teeth and gear valleys even in the presence of an air gap between the magnetic field sensor and the gear that may change from installation to installation or from time to time. Still further, the conventional magnetic field sensor must achieve these differentiations even in the presence of unit-to-unit variations in relative positions of the magnet and the magnetic field sensing element within the magnetic field sensor. Still further, the conventional magnetic field sensor must achieve these differentiations even in the presence of unit-to-unit variations in the magnetic field generated by the back-biased magnet. Still further, the conventional magnetic field sensor must achieve these differentiations even in the presence of variations of an axial rotation of the magnetic field sensor relative to the gear. Still further, the conventional magnetic field sensor must achieve these differentiations even in the presence of variations of temperature around the magnetic field sensor.

The above effects can result in expensive design choices. In particular, as described above, some of the above effects result it use of an expensive magnet.

It would be desirable to provide a magnetic field sensor in a back-biased arrangement that uses one or more magnetoresistance elements and that can achieve an accurate output signal that accurately differentiates between gear teeth and gear valleys while using a simpler and less expensive magnet.

It would be desirable to provide a magnetic field sensor in a back-biased arrangement that uses one or more magnetoresistance elements and that can avoid magnetic saturation of the one or more magnetoresistance elements.

SUMMARY

The present invention provides a magnetic field sensor in a back-biased arrangement that uses one or more magnetoresistance elements and that can achieve an accurate output signal that accurately differentiates between gear teeth and gear valleys while using a simpler and less expensive magnet.

The present invention also provides a magnetic field sensor in a back-biased arrangement that uses one or more magnetoresistance elements and that can avoid magnetic saturation of the one or more magnetoresistance elements.

In accordance with an example useful for understanding an aspect of the present invention, a magnetic field sensor for measuring movement of a ferromagnetic object, the movement in an x-y plane within x-y-z Cartesian coordinates with x, y, and z orthogonal axes, a direction of movement of a surface of the ferromagnetic object proximate to the magnetic field sensor in a direction parallel to the x axis, the magnetic field sensor can include a substrate having a major planar surface within forty-five degrees of parallel to the x-y plane. The magnetic field sensor can also include a magnet disposed proximate to the substrate, the magnet having at least two poles to generate a magnetic field parallel to the major planar surface of the substrate, wherein the substrate is disposed between the magnet and the ferromagnetic object, and wherein a straight line perpendicular to the major planar surface of the substrate does not intersect the ferromagnetic object and does not intersect the magnet. The magnetic field sensor can also include one or more magnetic field sensing elements disposed upon the major planar surface of the substrate, the one or more magnetic field sensing elements having respective major response axes parallel to the x-axis, the one or more magnetic field sensing elements configured to generate one or more respective magnetic field signals.

In accordance with an example useful for understanding another aspect of the present invention, a magnetic field sensor for measuring movement of a ferromagnetic object, the movement in an x-y plane within x-y-z Cartesian coordinates with x, y, and z orthogonal axes, a direction of movement of a surface of the ferromagnetic object proximate to the magnetic field sensor in a direction parallel to the x axis, the magnetic field sensor can include a substrate having a major planar surface within forty-five degrees of parallel to the x-y plane. The magnetic field sensor can also include a magnet disposed proximate to the substrate, the magnet having at least two poles to generate a magnetic field parallel to the major planar surface of the substrate, the magnet comprising a cavity therein, wherein the substrate is disposed within the cavity, and wherein a straight line perpendicular to the major planar surface of the substrate does not intersect the ferromagnetic object but does intersect the magnet. The magnetic field sensor can also include a one or more magnetic field sensing elements disposed upon the major planar surface of the substrate, the one or more magnetic field sensing elements having respective one or more major response axes parallel to the x-axis or parallel to the y-axis, the one or more magnetic field sensing elements configured to generate one or more respective magnetic field signals.

In accordance with an example useful for understanding another aspect of the present invention, a magnetic field sensor for measuring movement of a ferromagnetic object, the movement in an x-y plane within x-y-z Cartesian coordinates with x, y, and z orthogonal axes, a direction of movement of a surface of the ferromagnetic object proximate to the magnetic field sensor in a direction parallel to the x axis, the magnetic field sensor can include a substrate having a major planar surface within forty-five degrees of parallel to the x-y plane. The magnetic field sensor can also include a magnet disposed proximate to the substrate, the magnet having at least two poles to generate a magnetic field parallel to the major planar surface of the substrate, the magnet comprising a cavity therein, wherein the substrate is disposed within the cavity, and wherein a straight line perpendicular to the major planar surface of the substrate does not intersect the ferromagnetic object. The magnetic field sensor can also include first and second magnetic field sensing elements disposed upon the major planar surface of the substrate, the first and second magnetic field sensing elements having respective major response axes parallel to the x-axis or parallel to the y-axis the first and second magnetic field sensing elements configured to generate first and second magnetic field signals, respectively, wherein a straight line intersecting the first and second magnetic field sensing elements does not intersect the ferromagnetic object.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
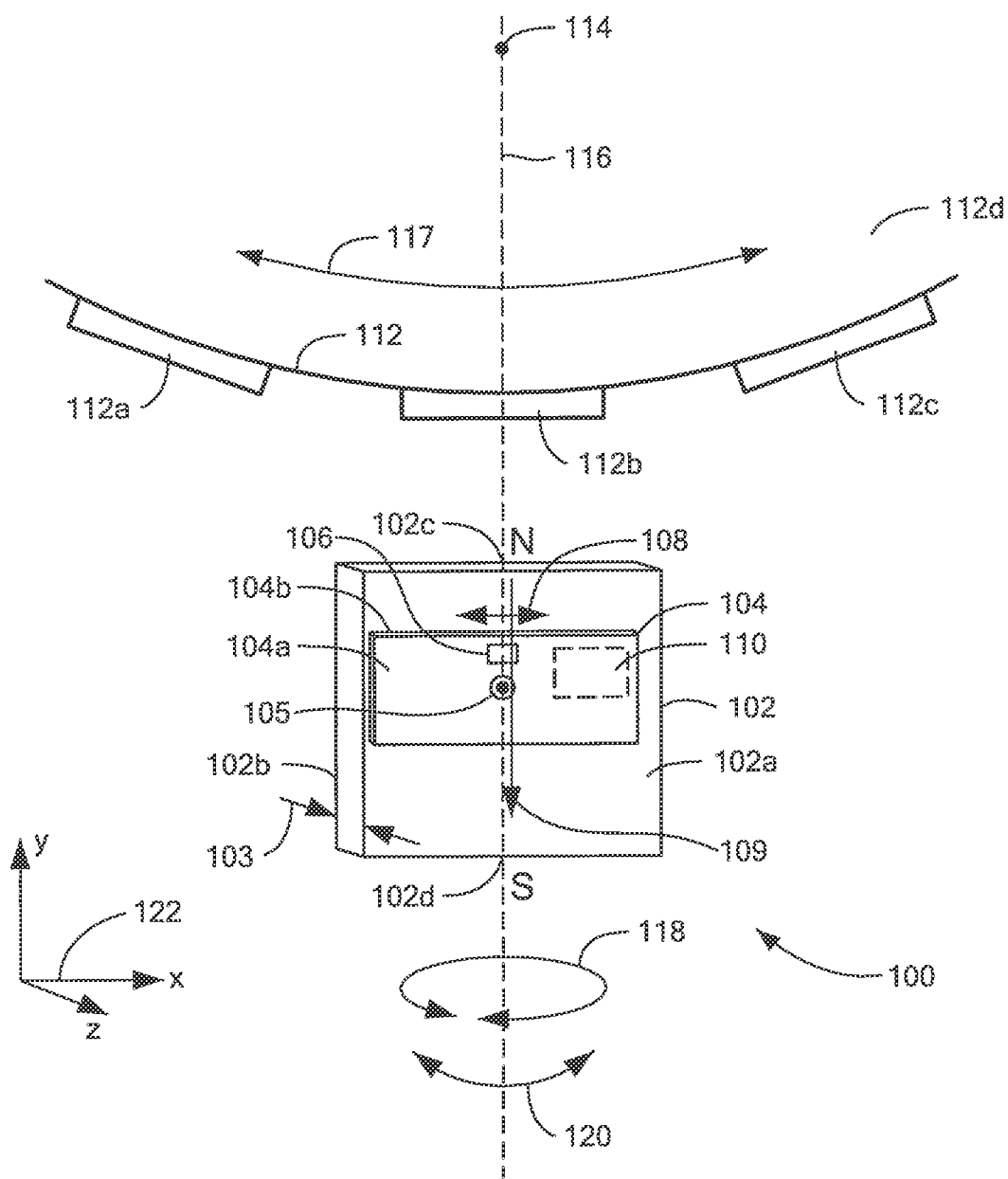
FIG. 1 is a block diagram of a magnetic field sensor having a magnet, one or more magnetic field sensing elements disposed upon a substrate, and an electronic circuit disposed upon the substrate, the magnetic field sensor proximate to a ferromagnetic object operable to move, the substrate, the magnet, and the ferromagnetic object all disposed at particular relative positions.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within+/−ten degrees.

As used herein, the term "baseline" and the phrase "baseline level" are used to describe a lowest magnitude (which may be near zero or may be some other magnetic field) of a magnetic field experienced by a magnetic field sensing element within a magnetic field sensor when the magnetic field sensor is operating in a system.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called comparator can be comprised of an analog comparator having a two state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the terms "line" and "linear" are used to describe either a straight line or a curved line. The line can be described by a function having any order less than infinite.

Referring to FIG. 1, an example of a magnetic field sensor 100 is responsive to a gear 112 having gear teeth, e.g., gear teeth 112a, 112b, 112c, and a major surface 112d in which the gear 112 rotates in accordance with an arrow 117. The gear 112 and/or the gear teeth 112a, 112b, 112c can be comprised of a ferromagnetic material, for example, an iron alloy.

The magnetic field sensor 100 can include one or more magnetic field sensing elements 106 coupled to an electronic circuit 110.

The one or more magnetic field sensing elements 106 and the electronic circuit 110 can be disposed upon a major surface 104a of (i.e., integrated within or upon) a substrate 104, e.g., a semiconductor substrate, e.g., silicon or germanium.

Orthogonal coordinate axes 122 have an x-axis, a y-axis, and a z-axis, such that the major surface 112d of the gear 112 is parallel to an x-y plane and the major surface 104a of the substrate 104 is also parallel to the x-y plane. However, it is described below that the substrate 104 can be oriented at other positions relative to the x-y plane.

In some embodiments, the one or more magnetic field sensing elements 106 are magnetoresistance elements with respective maximum response axes parallel to the x-axis and parallel to an arrow 108. In other embodiments, the one or more magnetic field sensing elements 106 are vertical Hall effect elements with respective maximum response axes parallel to the x-y plane. In some embodiments, the maximum response axes are parallel to the x-axis.

In some embodiments, the one or more magnetic field sensing elements 106 include two or more magnetic field sensing elements 106, in which case, a total separation between outer ones of the two or more magnetic field sensing elements 106 in a direction parallel to the x-axis can be between about 0.2 millimeters and about 2.0 millimeters.

In some embodiments, the total separation between outer ones of the two or more magnetic field sensing elements 106 is between about one half and about one and one half of a width of a ferromagnetic target object feature, for example, a gear tooth 112a of the ferromagnetic gear 112. In some other embodiments, the total separation between outer ones of the two or more magnetic field sensing elements 106 can be between about one half and about twice the width of the ferromagnetic target object feature. However, in other embodiments, the total separation is much smaller than half of the width, for example, one one hundredth of the width, or larger than twice the width.

The magnetic field sensor 100 can also include a magnet 102. The magnet 102 is configured to generate a magnetic field, which is directed parallel to the y-axis at the position of the one or more magnetic field sensing elements 106, and is directed parallel to the major surface 102a of the substrate 102.

The magnet 102 can have a center axis 116 parallel to the y-axis and passing through a middle of a width dimension 103 parallel to the z-axis. The one or more magnetic field sensing elements 106 can be proximate to the center axis 116. In some embodiments, the center axis 116 can intersect an axis of rotation 114 of the gear 112.

The one or more magnetic field sensing elements 106 can have respective maximum response axes parallel to the major surface 102 of the substrate 102 and parallel to the x-axis. In some embodiments, for which the one or more magnetic field sensing elements 106 include the two or more magnetic field sensing elements 106, the maximum response axes are parallel to each other. In some embodiments, the maximum response axes are substantially parallel to the x-axis and to the arrow 108.

A straight line 105 perpendicular to the major surface 104a of the substrate 104 (i.e., out of the page) and intersecting the substrate 104, also intersect the magnet 102 and does not intersect the gear 112. Furthermore, in some embodiments, where the one or more magnetic field sensing elements 106 comprise two or more magnetic field sensing elements, the two or more magnetic field sensing elements can be disposed at positions such that a straight line parallel to the x-axis intersects the two or more magnetic field sensing elements 106 and does not intersect the gear 112.

The substrate 104 can be disposed proximate to a surface 102a of the magnet 102.

In the embodiment shown, a straight line, as represented by an arrow 109, between north (N) and south (S) poles 102c, 102d, respectively, of the magnet 102 and passing through or adjacent to the one or more magnetic field sensing elements 106, but outside of the magnet 102, and in a direction substantially parallel to the major surface 104a of the substrate 104, is substantially parallel to the y-axis. In some embodiments, the straight line 109 between the north and south poles of the magnet 102 can be directed toward the gear 112.

The electronic circuit 110 is configured to generate an output signal (not shown). An example of the electronic circuit 110 is described below in conjunction with FIG. 12. Let it suffice here to say that the electronic circuit 110 can generate a difference of signals in accordance with an electronic circuit described below in conjunction with FIG. 12. Thus, it will be apparent that the magnetic field sensor 100 can be an edge detector. However, using other electronic circuits, the other electronic circuits can generate a sum of signals, in which case, the magnetic field sensor 100 can be a tooth detector (i.e., a feature detector).

For an edge detector, the output signal, when the gear 112 is rotating, is indicative of a speed of rotation of the gear 112 and also indicative of positions of edges of the gear teeth. For a tooth detector, the output signal, when the gear 112 is rotating, is indicative of a speed of rotation of the gear 112 and also indicative of positions near to centers of the gear teeth or gear valleys.

The magnet 102 can be comprised of one uniform material, and can have no central core, which is shown and described in conjunction with FIG. 1. However, in other embodiments, the magnet 102 can have a central core comprised of magnetically permeable material. In still other embodiments, the magnet 102 can have a core comprised of air or a core comprised of a non-ferromagnetic material. The core can have an axis aligned with the center axis 116.

The magnetic field sensor 100 uses the one or more magnetic field sensing elements 106 to generate a respective one or more magnetic field signals. It should be appreciated that, for embodiments for which the one or more magnetic field sensing elements 106 have respective maximum response axes parallel to the x-axis, i.e., perpendicular to a magnetic direction of the magnet 102 as represented by the arrow 109, the one or more magnetic field sensing elements 106 have a low baseline. Essentially, the one or more magnetic field sensing elements 106 have only a very small response to the magnetic field as represented by the arrow 109, or no response, until such time that the magnetic direction represented by the arrow 109 is altered to point to a different direction as gear teeth 112a, 112b, 112c pass by the one or more magnetic field sensing elements 106.

Furthermore, for embodiments for which the one or more magnetic field sensing elements 106 include two or more magnetic field sensing elements 106 to generate a respective two or more magnetic field signals, a difference of the above two or more magnetic field signals can result in an effect similar to a low baseline. In essence, when the two or more magnetic field sensing elements 106 experience the same magnetic field (i.e., proximate to a gear tooth or a gear valley), a differencing of the above differential signals results in a zero electronic signal.

The magnetic field sensor 100 can be rotated in a direction indicated by an arrow 118 to a next position one hundred eighty degrees apart from the position shown, with no degradation of performance. However, intermediate rotations may result in some increase of the baseline level. Useful rotations in the direction of the arrow 118 can be within about+/−forty five degrees of the position of the magnetic field sensor shown, or within about+/−forty five degrees of a one hundred eighty degree rotation of the magnetic field sensor 100. However, in some embodiments, rotations in the direction of the arrow 118 can be within about+/−five degrees of the position of the magnetic field sensor shown, or within about+/−five degrees of a one hundred eighty degree rotation of the magnetic field sensor 100.

The magnetic field sensor 100 can also be tilted in a direction of arrow 120 to some extent, however, with higher baseline level. In some embodiments, the magnetic field sensor 100 can be tilted in directions of the arrow by about+/−twenty degrees. In some embodiments, the magnetic field sensor 100 can be tilted in directions of the arrow by about+/−five degrees.

In some embodiments, the one or more magnetic field sensing elements 106 are magnetoresistance elements. In other embodiments, the one or more magnetic field sensing elements 106 are vertical Hall effect elements. To achieve a low baseline level, it is advantageous to use magnetic field sensing elements for which respective axes of maximum sensitivity are parallel or nearly parallel to the x-axis.

Figure 2:
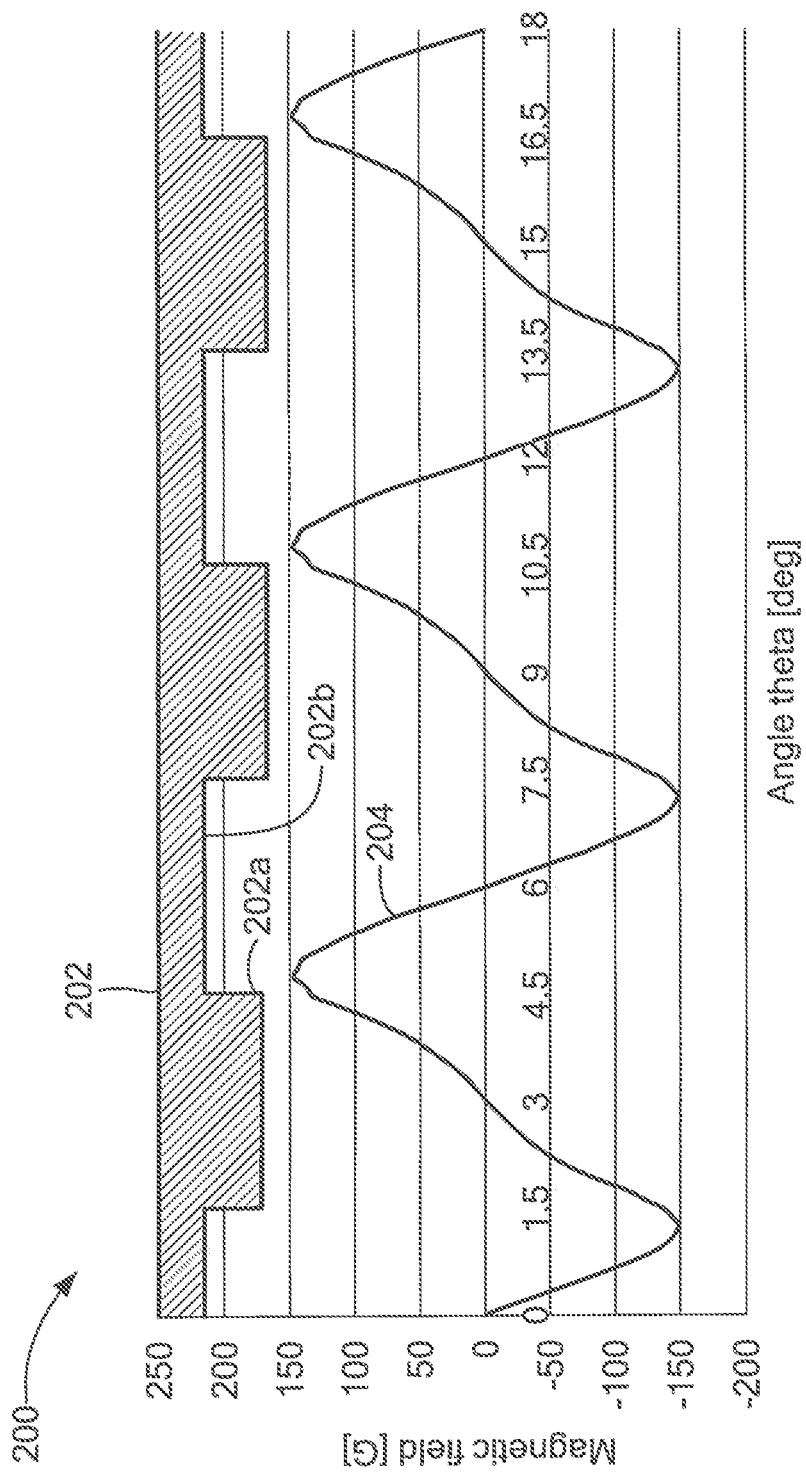
FIG. 2 is a graph showing magnetic fields experienced by the one or more magnetic field sensing elements of FIG. 1.

Referring now to FIG. 2, a graph 200 includes a vertical axis with a scale in units of magnetic field in Gauss and a horizontal axis with a scale in units of angle in units of Theta, wherein a Theta of three hundred sixty is indicative of one full rotation of the gear 112 of FIG. 1.

A block diagram 202 is indicative of a gear having gear teeth 202a and gear valleys 202b the same as or similar to the gear 112 of FIG. 1.

A curve 204 is indicative of a magnetic field parallel to the x-axis of FIG. 1, i.e., in the direction of the maximum response axis of the one or more magnetic field sensing elements 106, experienced by the one or more magnetic field sensing elements 106 of FIG. 1 as the gear 112 of FIG. 1 rotates.

For the curve 204, it assumed that the one or more magnetic field sensing elements 106 are disposed proximate to the magnet center axis 116 of the magnet 102 and that the magnet is symmetrical about the center axis 116.

The curve 204 has high values and low values. High values represent a transition from a tooth to a valley and low values represent a transition from a valley to a tooth of the gear 202.

For some magnetoresistance elements, undesirable saturation occurs at or near+/−one hundred fifty Gauss. It should be apparent that the one or more magnetic field sensing elements 106 with maximum response axes as shown in FIG. 1, i.e., parallel to the x-axis, remain in their linear region and out of saturation as the gear 112 rotates.

In some embodiments, the magnet 102 (and all other magnets described herein) is comprised of a bonded ferrite material. In other embodiments, the magnet 102 (and all other magnets described herein) can be comprised of another material, for example, NdFeB or SmCo.

An illustrative magnet 102 can be made of NeFeB and have a field strength of about 4200 Gauss at a surface of the magnet. Another illustrative magnet 102 can be made of SmCo and have a field strength of about 3800 Gauss at a surface of the magnet. Another illustrative magnet 102 can be made of ferrite and have a field strength of about 1500 Gauss at a surface of the magnet.

For examples used in graphs below, in some embodiments, the magnet 102 has a dimension parallel to the x-axis of about 5.5 mm, a dimension parallel to the y-axis of about 2.5 mm, and a dimension parallel to the z-axis of about 2.6 mm.

Also, for examples used in graphs below, in some embodiments, the gear 112 has gear teeth with widths of about 3.0 mm and gear valleys with widths of about 3.0 mm.

In embodiments for which the one or more magnetic field sensing elements 106 of FIG. 1 consist of one magnetic field sensing element, it should be recognized that the one magnetic field sensing element has a maximum response coincident with or near to a passing edge of a gear tooth. Thus, the one magnetic field sensing element provides an edge detector.

Figure 3:
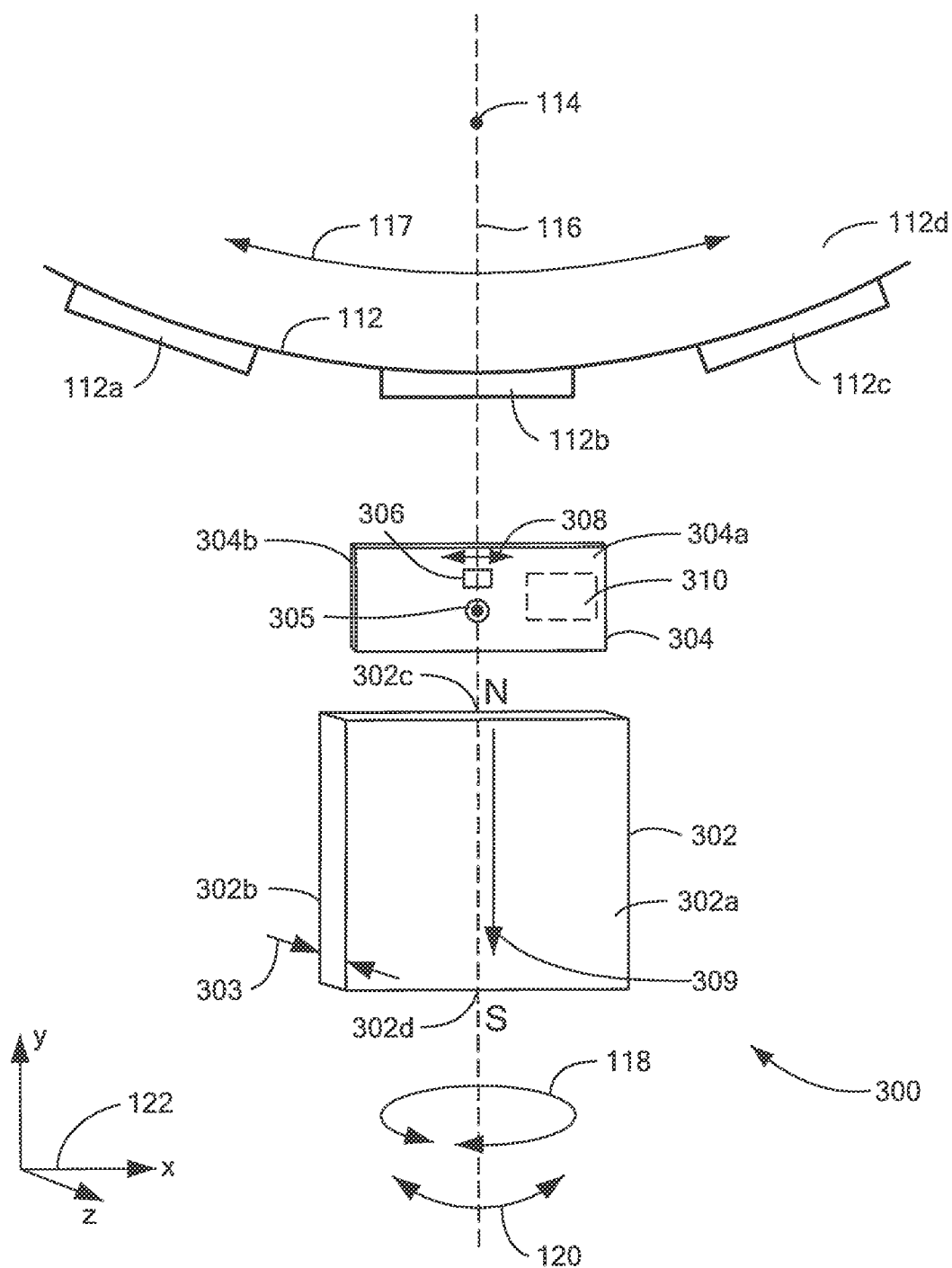
FIG. 3 is a block diagram of another magnetic field sensor having a magnet, one or more magnetic field sensing elements disposed upon a substrate, and an electronic circuit disposed upon the substrate, the magnetic field sensor proximate to a ferromagnetic object operable to move, the substrate, the magnet, and the ferromagnetic object all disposed at other particular relative positions.

Referring now to FIG. 3, in which like elements of FIG. 1 are shown having like reference designations, another example of a magnetic field sensor 300 is responsive to the gear 112 having gear teeth, e.g., gear the teeth 112a, 112b, 112c.

The magnetic field sensor 300 can include one or more magnetic field sensing elements 306 coupled to an electronic circuit 310.

The one or more magnetic field sensing elements 306 and the electronic circuit 310 can be disposed upon a major surface 304a of (i.e., integrated within or upon) a substrate 304, e.g., a semiconductor substrate, e.g., silicon or germanium.

The major surface 112d of the gear 112 is parallel to the x-y plane and the major surface 304a of the substrate 304 is also parallel to the x-y plane. However, it is described below that the substrate 304 can be oriented at other positions relative to the x-y plane.

In some embodiments, the one or more magnetic field sensing elements 306 are magnetoresistance elements with respective maximum response axes parallel to the x-axis and parallel to an arrow 308. In other embodiments, the one or more magnetic field sensing elements 306 are vertical Hall effect elements with respective maximum response axes parallel to the x-axis.

In some embodiments, the one or more magnetic field sensing elements 306 include two or more magnetic field sensing elements 306, in which case, a total separation between outer ones of the two or more magnetic field sensing elements 306 in a direction parallel to the x-axis can be between about 0.2 millimeters and about 2.0 millimeters.

In some embodiments, a total separation between outer ones of the two or more magnetic field sensing elements 306 can be between about one half and about one and one half of a width of a ferromagnetic target object feature, for example, a gear tooth 112a of the ferromagnetic gear 112. In some other embodiments, the total separation between outer ones of the two or more magnetic field sensing elements 306 can be between about one half and about twice the width of the ferromagnetic target object feature. However, in other embodiments, the total separation is much smaller than half of the width, for example, one one hundredth of the width, or larger than twice the width.

The magnetic field sensor 300 can also include a magnet 302. The magnet 302 can be the same as or similar to the magnet 102 of FIG. 1. The magnet 302 is configured to generate a magnetic field, which is generally directed at an angle in the y-z plane at the position of the one or more magnetic field sensing elements 306 (i.e., looping back downward toward the north pole 302c).

The magnet 302 can have the center axis 116 parallel to the y-axis and passing through a middle of a width dimension 303 parallel to the z-axis. The one or more magnetic field sensing elements 306 can be proximate to the center axis 116. In some embodiments, the center axis 116 can intersect the axis of rotation 114 of the gear 112.

The one or more magnetic field sensing elements 306 can have respective maximum response axes parallel to the major surface 304a of the substrate 304 and parallel to the x-axis. In some embodiments, for which the one or more magnetic field sensing elements 306 include the two or more magnetic field sensing elements 306, the maximum response axes are parallel to each other. In some embodiments, the maximum response axes are substantially parallel to the x-axis and to the arrow 308.

A straight line 305 perpendicular to the major surface 302a of the substrate (i.e., out of the page) and intersecting the substrate 302, does not intersect the magnet 302 and does not intersect the gear 112. Furthermore, in some embodiments, where the one or more magnetic field sensing elements 306 comprise two or more magnetic field sensing elements, the two or more magnetic field sensing elements can be disposed at positions such that a straight line parallel to the x-axis intersects the two or more magnetic field sensing elements 306 and does not intersect the gear 112.

The substrate 304 can be disposed between the magnet 302 and the gear 112.

In the embodiment shown, a straight line, as represented by an arrow 309, is indicative of a magnetic field directed between north (N) and south (S) poles 309c, 309d, respectively, of the magnet 302, but outside of the magnet 302, is substantially parallel to the y-axis. The line of magnetic field returns to the north pole 302c of the magnet 302. In some embodiments, the straight line 309 between the north and south poles of the magnet 302 can be directed toward the gear 112.

The electronic circuit 310 is configured to generate an output signal (not shown). An exemplary electronic circuit 310 can be the same as or similar to the electronic circuit 110 of FIG. 1 and described below in conjunction with FIG. 12.

For an edge detector, the output signal, when the gear 112 is rotating, is indicative of speed of rotation of the gear 112 and also indicative of positions of edges of the gear teeth. For a tooth detector, the output signal, when the gear 112 is rotating, is indicative of speed of rotation of the gear 112 and also indicative of positions near to centers of the gear teeth or gear valleys.

The magnetic field sensor 300 uses the one or more magnetic field sensing elements 306 to generate a respective one or more magnetic field signals. It should be appreciated that, for embodiments for which the one or more magnetic field sensing elements 306 have respective maximum response axes parallel to the x-axis, the one or more magnetic field sensing elements 306 have a low baseline. Essentially, the one or more magnetic field sensing elements 306 have only a very small response to the magnetic field as represented by the arrow 309 (looping back down toward the north pole 309c in the y-z plane at the position of the one or more magnetic field sensing elements 306), or no response, until such time that the magnetic direction represented by the arrow 309 is altered to point to a different direction as gear teeth 112a, 112b, 112c pass by the one or more magnetic field sensing elements 306.

Furthermore, for embodiments for which the one or more magnetic field sensing elements 306 include two or more magnetic field sensing elements 306 to generate a respective two or more magnetic field signals, a difference of the above two or more magnetic field signals can result in an effect similar to a low baseline. In essence, when the two or more magnetic field sensing elements 306 experience the same magnetic field (i.e., proximate to a gear tooth or a gear valley), a differencing of the above differential signals results in a zero electronic signal.

Rotations indicated by the arrow 118 and tilts indicated by the arrow 120 described above in conjunction with FIG. 1 also apply to the magnetic field sensor 300.

Figure 4:
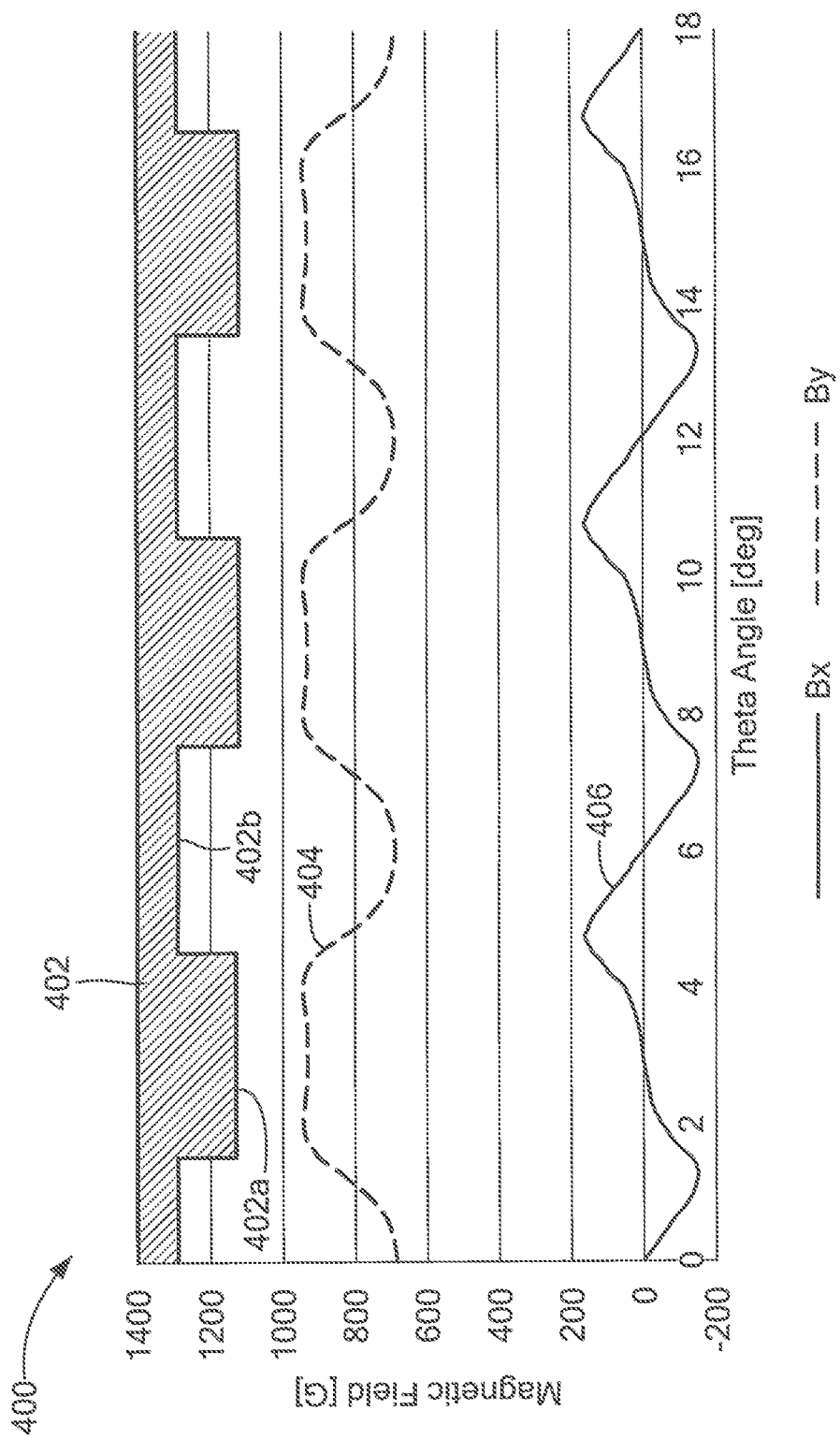
FIG. 4 is a graph showing magnetic fields experienced by the one or more magnetic field sensing elements of FIG. 3.

Referring now to FIG. 4, a graph 400 includes a vertical axis with a scale in units of magnetic field in Gauss and a horizontal axis with a scale in units of angle in units of Theta, wherein a Theta of three hundred sixty is indicative of one full rotation of the gear 112 of FIGS. 1 and 3.

A block diagram 402 is indicative of a gear having gear teeth 402a and gear valleys 402b the same as or similar to the gear 112 of FIG. 1.

A curve 404 is indicative of a magnetic field parallel to the y-axis of FIG. 3, i.e., in a direction perpendicular to the maximum response axis of the one or more magnetic field sensing elements experienced by the one or more magnetic field sensing elements 306 as the gear 112 of FIG. 1 rotates.

A curve 406 is indicative of a magnetic field parallel to the x-axis of FIG. 3, i.e., in a direction parallel to the maximum response axis of the one or more magnetic field sensing elements, experienced by the one or more magnetic field sensing elements 306 of FIG. 3 the gear 112 of FIG. 1 rotates.

The curves 404, 406 have respective high values and respective low values. High values represent a transition from a tooth to a valley and low values represent a transition from a valley to a tooth of the gear 402.

As described above, for some magnetoresistance elements, undesirable saturation occurs at or near+/− one hundred fifty Gauss. It should be apparent that the one or more magnetic field sensing elements 306 with maximum response axes as shown in FIG. 3, i.e., parallel to the x-axis, remain in their linear region in accordance with the curve 406 and out of saturation. In contrast, if the one or more magnetic field sensing elements 306 had maximum response axes parallel to the y-axis of FIG. 3, then they would sense the magnetic field of curve 404 and they would be in constant saturation and unusable.

In embodiments for which the one or more magnetic field sensing elements 306 of FIG. 3 consist of one magnetic field sensing element, it should be recognized that the one magnetic field sensing element 306 has a maximum response coincident with or near to a passing edge of a gear tooth. Thus, the one magnetic field sensing element provides an edge detector.

Figure 5:
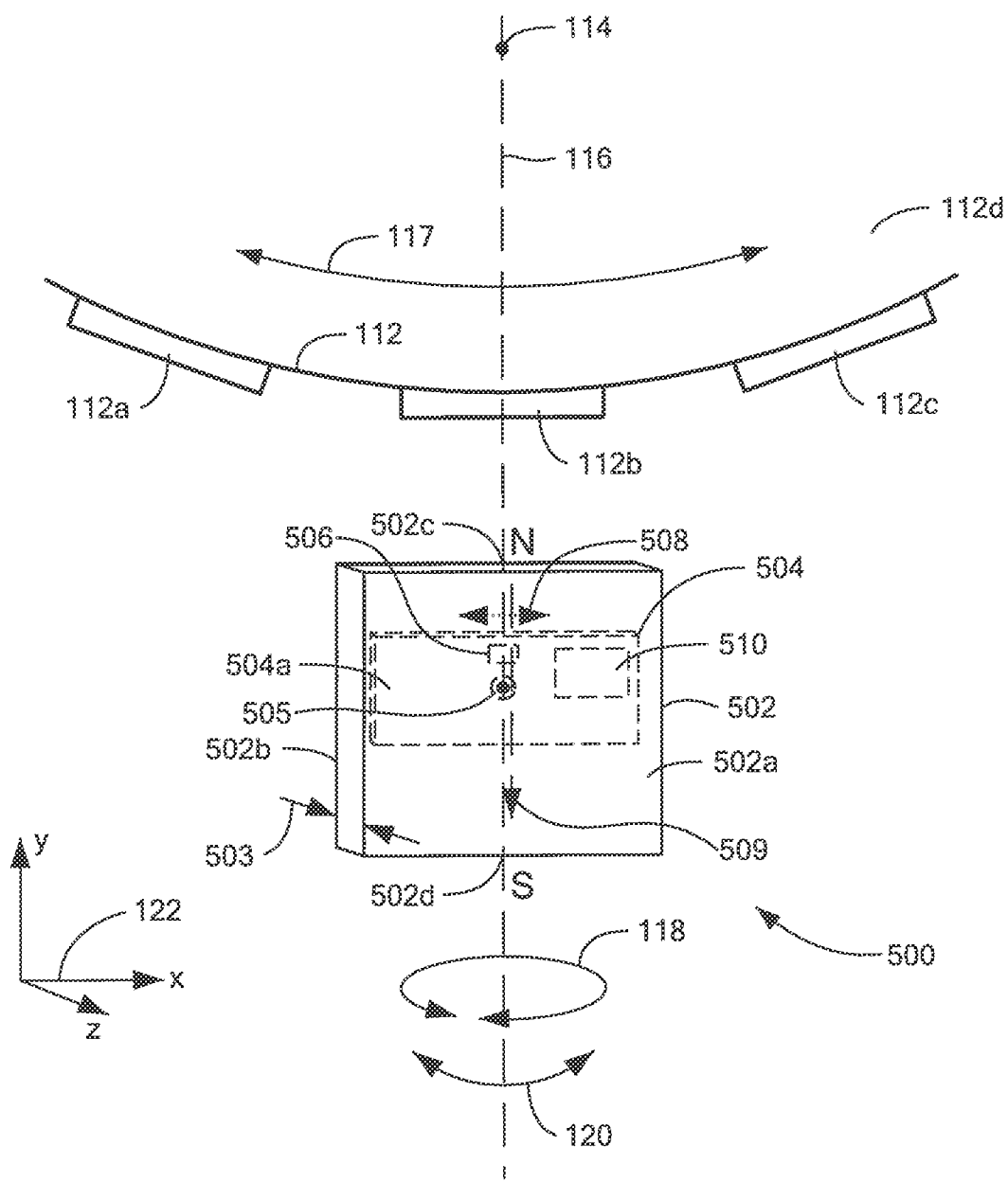
FIG. 5 is a block diagram of another magnetic field sensor having a magnet, one or more magnetic field sensing elements disposed upon a substrate, and an electronic circuit disposed upon the substrate, the magnetic field sensor proximate to a ferromagnetic object operable to move, the substrate, the magnet, and the ferromagnetic object all disposed at still other particular relative positions.

Referring now to FIG. 5, in which like elements of FIGS. 1 and 3 have like reference designations, another example of a magnetic field sensor 500 is responsive to the gear 112 having gear teeth, e.g., gear the teeth 112a, 112b, 112c.

The magnetic field sensor 500 can include one or more magnetic field sensing elements 506 coupled to an electronic circuit 510.

The one or more magnetic field sensing elements 506 and the electronic circuit 510 can be disposed upon a major surface 504a of (i.e., integrated within or upon) a substrate 504, e.g., a semiconductor substrate, e.g., silicon or germanium.

Orthogonal coordinate axes 122 show the reference axes x, y and z, such that the major surface 112d of the gear 112 is parallel to an x-y plane and the major surface 504a of the substrate 504 is also parallel to the x-y plane. However, it is described below that the substrate 504 can be oriented at other positions relative to the x-y plane.

In some embodiments, the one or more magnetic field sensing elements 506 are magnetoresistance elements with respective maximum response axes parallel to the x-axis and parallel to an arrow 508. In other embodiments, the one or more magnetic field sensing elements 506 are vertical Hall effect elements with respective maximum response axes parallel to the x-axis.

In some embodiments, the one or more magnetic field sensing elements 506 include two or more magnetic field sensing elements 506, in which case, a total separation between outer ones of the two or more magnetic field sensing elements 506 in a direction parallel to the x-axis can be between about 0.2 millimeters and about 2.0 millimeters.

In some embodiments, a total separation between outer ones of the two or more magnetic field sensing elements 506 can be between about one half and about one and one half of a width of a ferromagnetic target object feature, for example, a gear tooth 112a of the ferromagnetic gear 112. In some other embodiments, the total separation between outer ones of the two or more magnetic field sensing elements 506 can be between about one half and about twice the width of the ferromagnetic target object feature. However, in other embodiments, the total separation is much smaller than half of the width, for example, one one hundredth of the width, or larger than twice the width.

The magnetic field sensor 500 can also include a magnet 502. The magnet 502 is configured to generate a magnetic field, which is generally directed parallel to the y-axis at the position of the one or more magnetic field sensing elements 506 and is generally parallel to the major surface 504a of the substrate 504.

The magnet 502 can have the center axis 116 parallel to the y-axis and passing through a middle of a width dimension 503 parallel to the z-axis. The one or more magnetic field sensing elements 506 can be proximate to the center axis 116. In some embodiments, the center axis 116 can intersect the axis of rotation 114 of the gear 112.

As indicated by phantom lines, the substrate 504 can be disposed inside of the magnet 502.

While not shown, the magnet 502 can have an opening into which the substrate 504 is inserted to achieve the substrate 504 inside of the magnet 502.

The one or more magnetic field sensing elements 506 have respective maximum response axes parallel to the major surface 504a of the substrate 504 and parallel to the x-axis. In some embodiments, for which the one or more magnetic field sensing elements 506 include the two or more magnetic field sensing elements 506, the maximum response axes are parallel to each other. In some embodiments, the maximum response axes are substantially parallel to the x-axis and to the arrow 508.

A straight line 505 perpendicular to the major surface 502a of the substrate (i.e., out of the page) and intersecting the substrate 502, intersects the magnet 502 and does not intersect the gear 112. Furthermore, in some embodiments, where the one or more magnetic field sensing elements 506 comprise two or more magnetic field sensing elements, the two or more magnetic field sensing elements can be disposed at positions such that a straight line parallel to the x-axis intersects the two or more magnetic field sensing elements 506 and does not intersect the gear 112.

In the embodiment shown, a straight line, as represented by an arrow 509 inside of the magnet 502, is indicative of a magnetic field directed between north (N) and south (S) poles 502c, 502d, respectively, of the magnet 502 and passing through or adjacent to the one or more magnetic field sensing elements 506 in a direction substantially parallel to the major surface 504a of the substrate 504, and is substantially parallel to the y-axis as the line of magnetic field returns to the north pole 502c of the magnet 502. In some embodiments, the straight line 509 between the north and south poles of the magnet 502 can be directed toward the gear 112.

The electronic circuit 510 is configured to generate an output signal (not shown). An exemplary electronic circuit 510 can be the same as or similar to the electronic circuit 110 of FIG. 1 and described below in conjunction with FIG. 12.

For an edge detector, the output signal, when the gear 112 is rotating, is indicative of speed of rotation of the gear 112 and also indicative of positions of edges of the gear teeth. For a tooth detector, the output signal, when the gear 112 is rotating, is indicative of speed of rotation of the gear 112 and also indicative of positions near to centers of the gear teeth or gear valleys.

The magnetic field sensor 500 uses the one or more magnetic field sensing elements 506 to generate a respective one or more magnetic field signals. It should be appreciated that, for embodiments for which the one or more magnetic field sensing elements 506 have respective maximum response axes parallel to the x-axis, i.e., perpendicular to a magnetic direction of the magnet 502 as represented by the arrow 509, the one or more magnetic field sensing elements 506 have a low baseline. Essentially, the one or more magnetic field sensing elements 506 have only a very small response to the magnetic field as represented by the arrow 509 or no response, until such time that the magnetic direction represented by the arrow 509 is altered to point to a different direction as gear teeth 112a, 112b, 112c pass by the one or more magnetic field sensing elements 506.

Furthermore, for embodiments for which the one or more magnetic field sensing elements 506 include two or more magnetic field sensing elements 506 to generate a respective two or more magnetic field signals, a difference of the above two or more magnetic field signals can result in an effect similar to a low baseline. In essence, when the two or more magnetic field sensing elements 506 experience the same magnetic field (i.e., proximate to a gear tooth or a gear valley), a differencing of the above differential signals results in a zero electronic signal.

Rotations indicated by the arrow 118 and tilts indicated by the arrow 120 described above in conjunction with FIG. 1 also apply to the magnetic field sensor 500.

Figure 6:
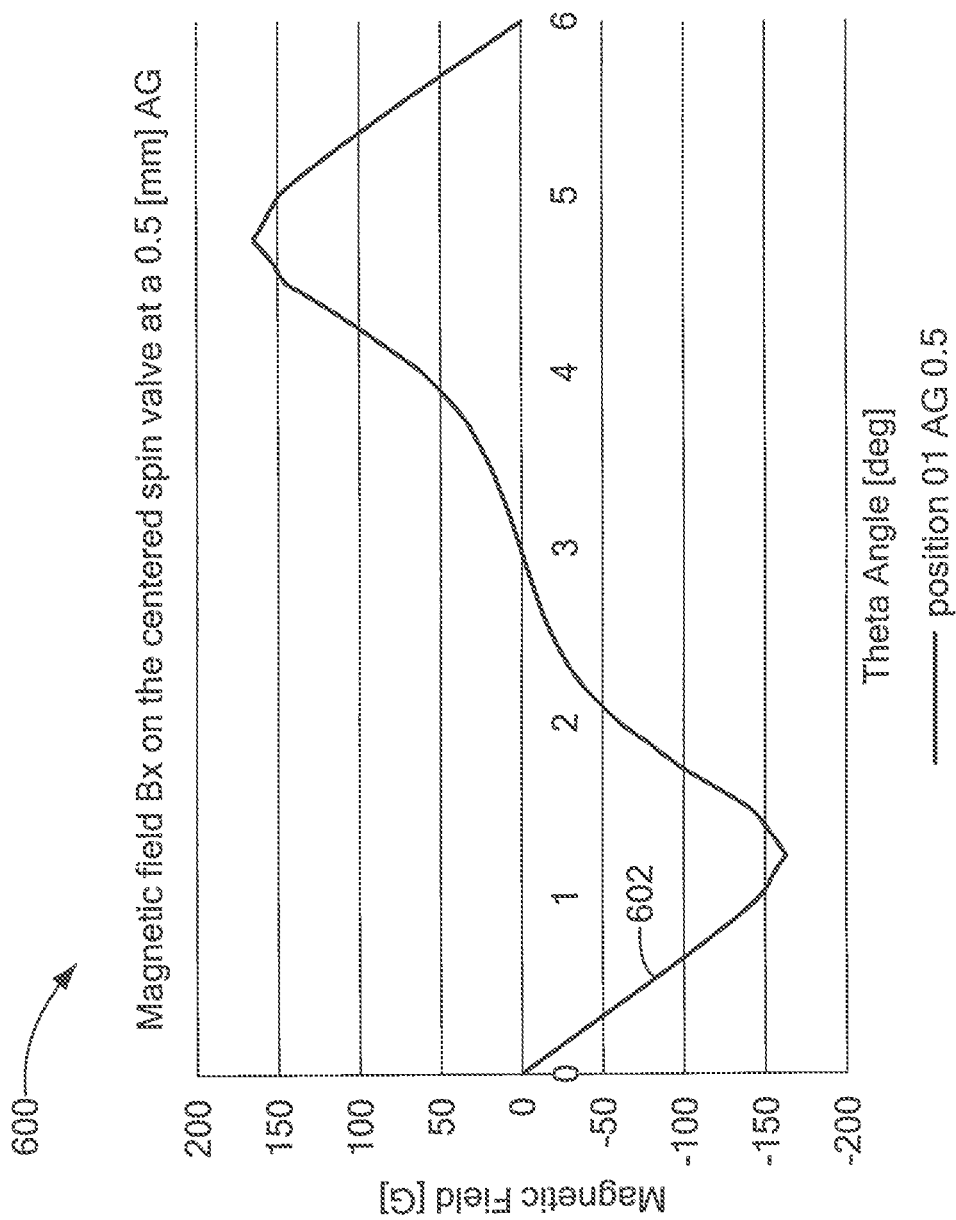
FIG. 6 is a graph showing magnetic fields experienced by the one or more magnetic field sensing elements of FIG. 5.

Referring now to FIG. 6, a graph 600 includes a vertical axis with a scale in units of magnetic field in Gauss and a horizontal axis with a scale in units of angle in units of Theta, wherein a Theta of three hundred sixty is indicative of one full rotation of the gear 112 of FIGS. 1, 3, and 5.

A curve 602 is indicative of a magnetic field parallel to the x-axis of FIG. 5, i.e., in a direction parallel to the maximum response axis of the one or more magnetic field sensing elements experienced by the one or more magnetic field sensing elements 506 of FIG. 5 with and air gap (AG) of about 0.5 mm as the gear 112 of FIG. 5 rotates.

The curve 602 has high values and low values. The curve 602 has high values that represent a transition from a tooth to a valley and low values represent a transition from a valley to a tooth.

As described above, for some magnetoresistance elements, undesirable saturation occurs at or near+/−one hundred fifty Gauss. It should be apparent that the one or more magnetic field sensing elements 506 with a maximum response axis as shown in FIG. 5, i.e., parallel to the x-axis, remain in their linear region in accordance with the curve 602 and out of saturation.

In embodiments for which the one or more magnetic field sensing elements 506 of FIG. consist of one magnetic field sensing element, it should be recognized that the one magnetic field sensing element 506 has a maximum response coincident with or near to a passing edge of a gear tooth. Thus, the one magnetic field sensing element provides an edge detector.

Figure 7:
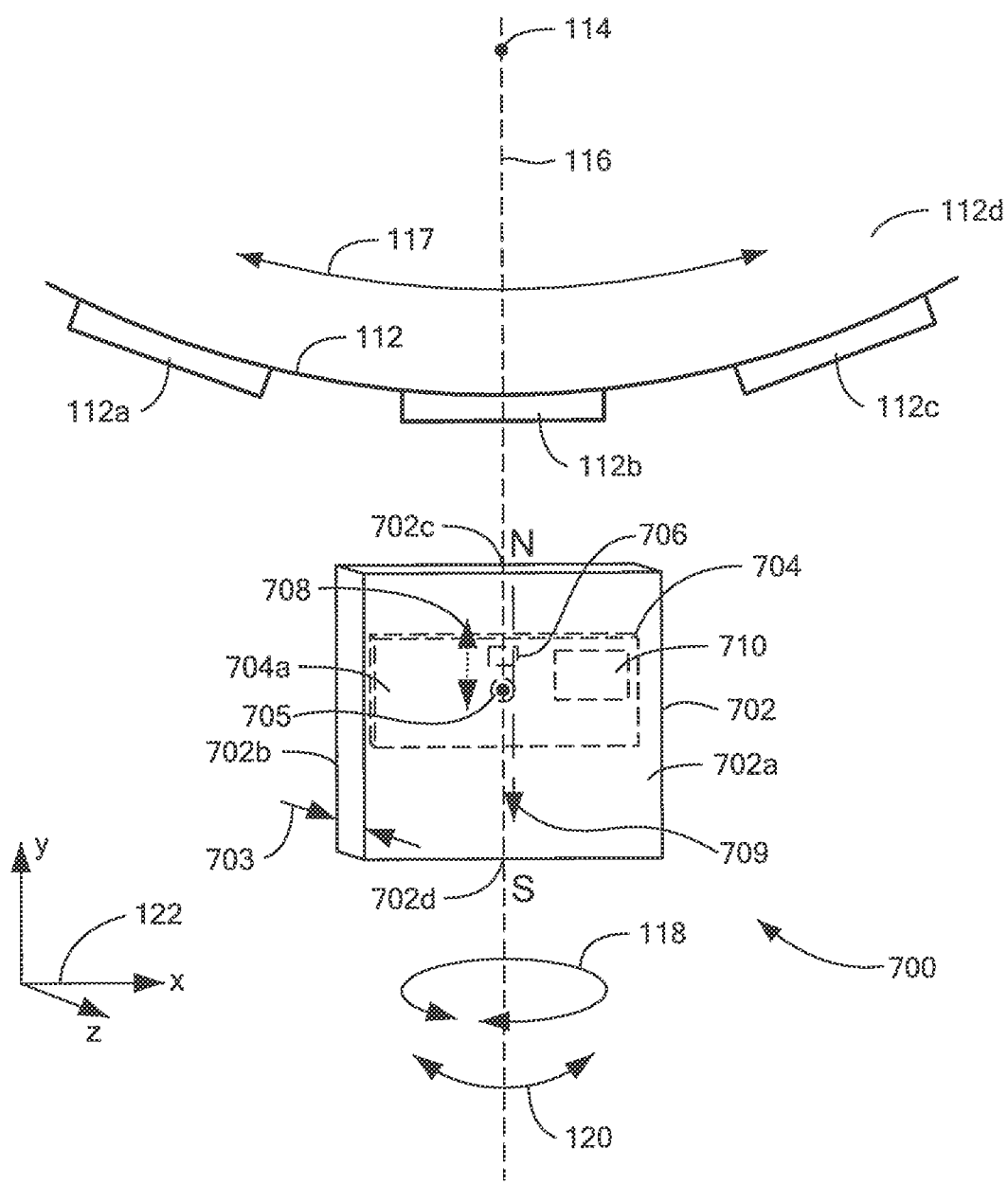
FIG. 7 is a block diagram of another magnetic field sensor having a magnet, one or more magnetic field sensing elements disposed upon a substrate, and an electronic circuit disposed upon the substrate, the magnetic field sensor proximate to a ferromagnetic object operable to move, the substrate, the magnet, and the ferromagnetic object all disposed at still other particular relative positions.

Referring now to FIG. 7, in which like elements of FIGS. 1, 3, and 5 have like reference designations, another example of a magnetic field sensor 700 is responsive to the gear 112 having gear teeth, e.g., gear the teeth 112a, 112b, 112c.

The magnetic field sensor 700 can include one or more magnetic field sensing elements 706 coupled to an electronic circuit 710.

The one or more magnetic field sensing elements 706 and the electronic circuit 710 can be disposed upon a major surface 704a of (i.e., integrated within or upon) a substrate 704, e.g., a semiconductor substrate, e.g., silicon or germanium.

Orthogonal coordinate axes 122 include an x-axis, a y-axis, and a z-axis, such that the major surface 112d of the gear 112 is parallel to an x-y plane and the major surface 704a of the substrate 704 is also parallel to the x-y plane. However, it is described below that the substrate 704 can be oriented at other positions relative to the x-y plane.

In some embodiments, the one or more magnetic field sensing elements 706 are magnetoresistance elements with respective maximum response axes parallel to the y-axis and parallel to an arrow 708. In other embodiments, the one or more magnetic field sensing elements 706 are vertical Hall effect elements with respective maximum response axes parallel to the y-axis.

In some embodiments, the one or more magnetic field sensing elements 706 include two or more magnetic field sensing elements 706, in which case, a total separation between outer ones of the two or more magnetic field sensing elements 706 in a direction parallel to the x-axis can be between about 0.2 millimeters and about 2.0 millimeters.

In some embodiments, a total separation between outer ones of the two or more magnetic field sensing elements 706 can be between about one half and about one and one half of a width of a ferromagnetic target object feature, for example, a gear tooth 112a of the ferromagnetic gear 112. In some other embodiments, the total separation between outer ones of the two or more magnetic field sensing elements 706 can be between about one half and about twice the width of the ferromagnetic target object feature. However, in other embodiments, the total separation can be much smaller than half of the width, for example, one one hundredth of the width, or larger than twice the width.

The magnetic field sensor 700 can also include a magnet 702. The magnet 702 can be the same as or similar to the magnet 502 of FIG. 5, and is configured to generate a magnetic field, which is generally directed parallel to the y-axis at the position of the one or more magnetic field sensing elements 706 and is generally parallel to the major surface 704a of the substrate 704.

The magnet 702 can have the center axis 116 parallel to the y-axis and passing through a middle of a width dimension 703 parallel to the z-axis. The one or more magnetic field sensing elements 706 can be proximate to the center axis 116. In some embodiments, the center axis 116 can intersect the axis of rotation 114 of the gear 112.

As indicated by phantom lines, the substrate 704 can be disposed inside of the magnet 702.

While not shown, the magnet 702 can have an opening into which the substrate 704 is inserted to achieve the substrate 704 inside of the magnet 702.

The one or more magnetic field sensing elements 706 have respective maximum response axes parallel to the major surface 704a of the substrate 704 and parallel to the y-axis. In some embodiments, for which the one or more magnetic field sensing elements 706 include the two or more magnetic field sensing elements 706, the maximum response axes are parallel to each other. In some embodiments, the maximum response axes are substantially parallel to the y-axis and to the arrow 708.

A straight line 705 perpendicular to the major surface 702a of the substrate (i.e., out of the page) and intersecting the substrate 702, intersects the magnet 702 and does not intersect the gear 112. Furthermore, in some embodiments, where the one or more magnetic field sensing elements 706 comprise two or more magnetic field sensing elements, the two or more magnetic field sensing elements can be disposed at positions such that a straight line parallel to the x-axis intersects the two or more magnetic field sensing elements 706 and does not intersect the gear 112.

In the embodiment shown, a straight line, as represented by an arrow 709 inside of the magnet 702, is indicative of a magnetic field directed between north (N) and south (S) poles 702c, 702d, respectively, of the magnet 702 and passing through or adjacent to the one or more magnetic field sensing elements 706 in a direction substantially parallel to the major surface 704a of the substrate 704, and is substantially parallel to the y-axis as the line of magnetic field returns to the north pole 702c of the magnet 702. In some embodiments, the straight line 709 between the north and south poles of the magnet 702 can be directed toward the gear 112.

The electronic circuit 710 is configured to generate an output signal (not shown). An exemplary electronic circuit 710 can be the same as or similar to the electronic circuit 110 of FIG. 1 and described below in conjunction with FIG. 12.

For an edge detector, the output signal, when the gear 112 is rotating, is indicative of speed of rotation of the gear 112 and also indicative of positions of edges of the gear teeth. For a tooth detector, the output signal, when the gear 112 is rotating, is indicative of speed of rotation of the gear 112 and also indicative of positions near to centers of the gear teeth or gear valleys.

The magnetic field sensor 700 uses the one or more magnetic field sensing elements 706 to generate a respective one or more magnetic field signals. It should be appreciated that, for embodiments for which the one or more magnetic field sensing elements 706 have respective maximum response axes parallel to the y-axis, i.e., parallel to a magnetic direction of the magnet 702 as represented by the arrow 709, the one or more magnetic field sensing elements 706 can still have a low baseline.

Furthermore, for embodiments for which the one or more magnetic field sensing elements 706 include two or more magnetic field sensing elements 706 to generate a respective two or more magnetic field signals, a difference of the above two or more magnetic field signals can result in an effect similar to a low baseline. In essence, when the two or more magnetic field sensing elements 706 experience the same magnetic field (i.e., proximate to a gear tooth or a gear valley), a differencing of the above differential signals results in a zero electronic signal.

Rotations indicated by the arrow 118 and tilts indicated by the arrow 120 described above in conjunction with FIG. 1 also apply to the magnetic field sensor 700.

Figure 8:
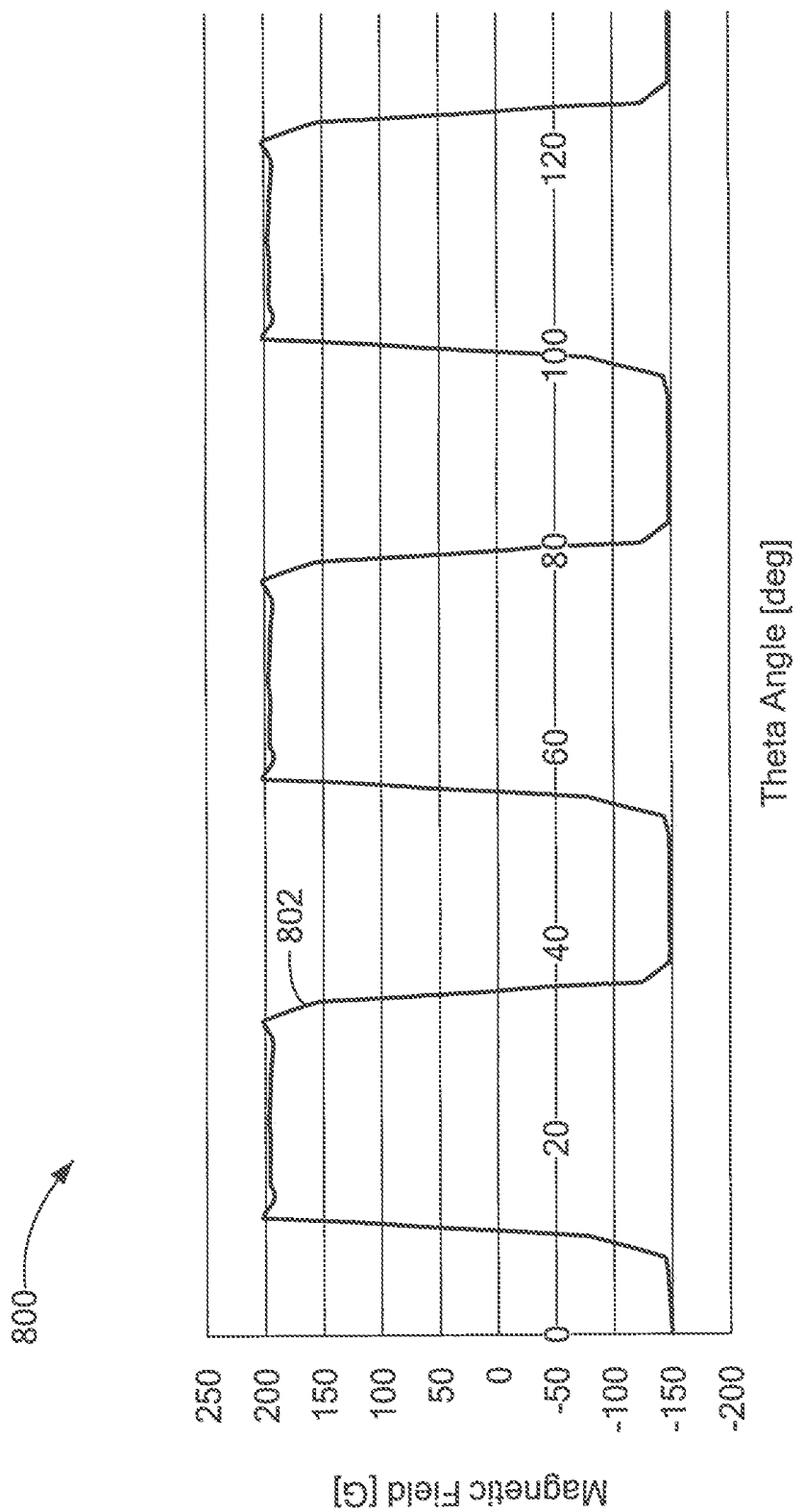
FIG. 8 is a graph showing magnetic fields experienced by the one or more magnetic field sensing elements of FIG. 7.

Referring now to FIG. 8, a graph 800 includes a vertical axis with a scale in units of magnetic field in Gauss and a horizontal axis with a scale in units of angle in units of Theta, wherein a Theta of three hundred sixty is indicative of one full rotation of the gear 112 of FIGS. 1, 3, 5, and 7.

A curve 802 is indicative of a magnetic field parallel to the y-axis of FIG. 7, i.e., in a direction parallel to the maximum response axis of the one or more magnetic field sensing elements, experienced by the one or more magnetic field sensing elements 706 of FIG. 7 as the gear 112 of FIG. 7 rotates.

The curve 802 has high values and low values. The curve 802 has high values that represent a transition from a tooth to a valley and low values represent a transition from a valley to a tooth.

As described above, for some magnetoresistance elements, undesirable saturation occurs at or near+/−one hundred fifty Gauss. It should be apparent that the one or more magnetic field sensing elements 706 with a maximum response axis as shown in FIG. 7, i.e., parallel to the y-axis, does remain in its linear region in accordance with the curve 802.

In embodiments for which the one or more magnetic field sensing elements 706 of FIG. 7 consist of one magnetic field sensing element, it should be recognized that the one magnetic field sensing element 706 has a maximum response coincident with or near to a passing edge of a gear tooth. The one magnetic field sensing element provides a tooth detector.

Figure 9:
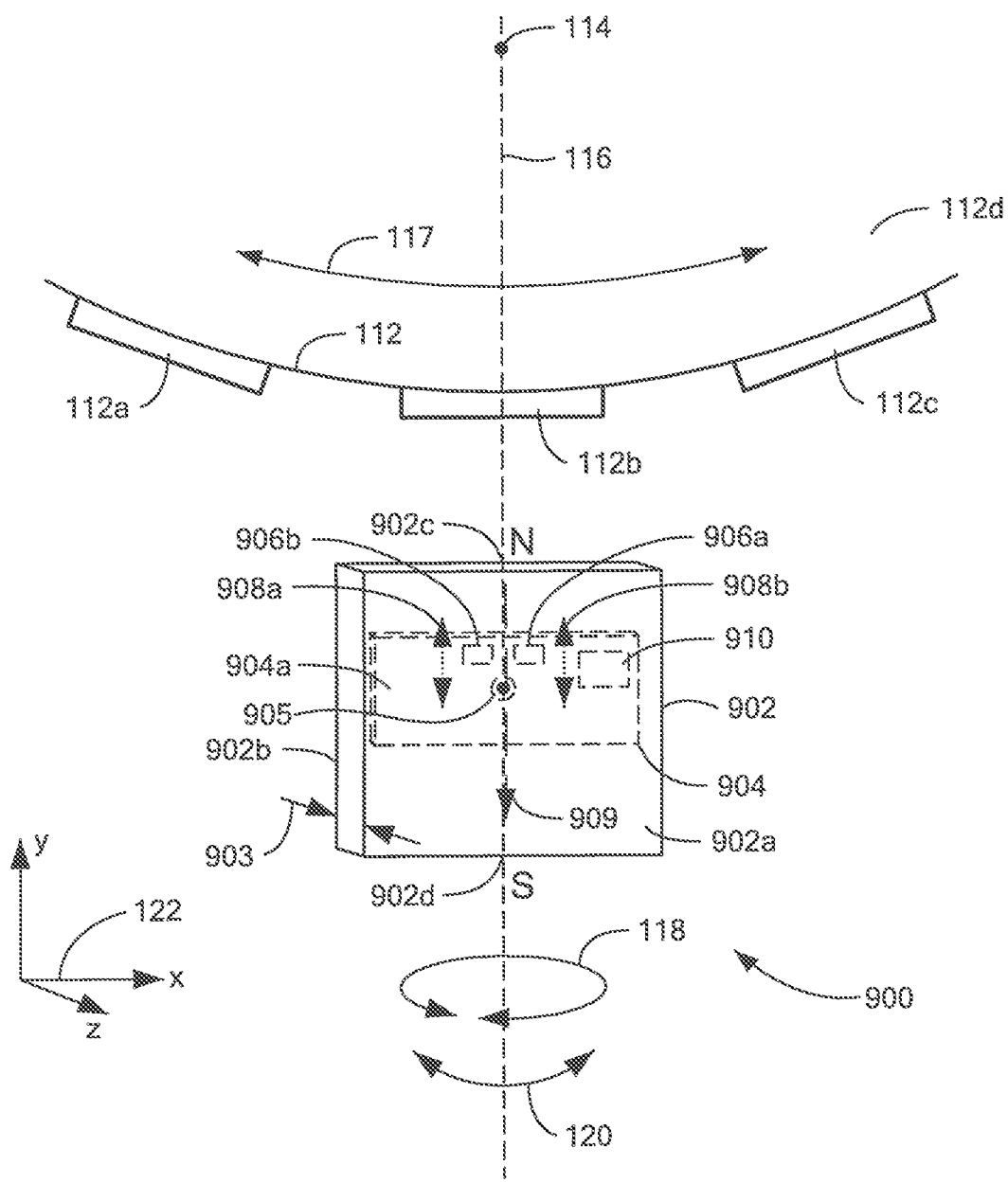
FIG. 9 is a block diagram of another magnetic field sensor having a magnet, first and second magnetic field sensing elements disposed upon a substrate, and an electronic circuit disposed upon the substrate, the magnetic field sensor proximate to a ferromagnetic object operable to move, the substrate, the magnet, and the ferromagnetic object all disposed at still other particular relative positions.

Referring now to FIG. 9, in which like elements of FIGS. 1, 3, 5, and 7 have like reference designations, another example of a magnetic field sensor 900 is responsive to the gear 112 having gear teeth, e.g., gear the teeth 112a, 112b, 112c.

The magnetic field sensor 900 can include first and second magnetic field sensing elements 906a, 906b coupled to an electronic circuit 910.

The first and second magnetic field sensing elements 906a, 906b and the electronic circuit 910 can be disposed upon a major surface 904a of (i.e., integrated within or upon) a substrate 904, e.g., a semiconductor substrate, e.g., silicon or germanium.

Orthogonal coordinate axes 122 include an x-axis, a y-axis, and a z-axis, such that the major surface 112d of the gear 112 is parallel to an x-y plane and the major surface 904a of the substrate 904 is also parallel to the x-y plane. However, it is described below that the substrate 904 can be oriented at other positions relative to the x-y plane.

In some embodiments, the first and second magnetic field sensing elements 906a, 906b are magnetoresistance elements with respective maximum response axes parallel to the y-axis and parallel to arrows 908a, 908b, respectively. In other embodiments, the first and second magnetic field sensing elements 906a, 906b are vertical Hall effect elements with respective maximum response axes parallel to the y-axis.

The first and second magnetic field sensing elements 906a, 906b can be separated in a direction parallel to the x-axis by a distance between about 0.2 millimeters and about 2.0 millimeters.

In some embodiments, the first and second magnetic field sensing elements 906a, 906b have a separation (i.e., a total separation) between about one half and about one and one half of a width of a ferromagnetic target object feature, for example, a gear tooth 112a of the ferromagnetic gear 112. In some other embodiments, first and second magnetic field sensing elements 906a, 906b have a separation between about one half and about twice the width of the ferromagnetic target object feature. However, in other embodiments, the separation is much smaller than half of the width, for example, one one hundredth of the width, or larger than twice the width.

The magnetic field sensor 900 can also include a magnet 902. The magnet 902 can be the same as or similar to the magnets 502, 702 of FIGS. 5 and 7, and is configured to generate a magnetic field, which is generally directed parallel to the y-axis at the position of the first and second magnetic field sensing elements 906a, 906b and is generally parallel to the major surface 904a of the substrate 904.

The magnet 902 can have the center axis 116 parallel to the y-axis and passing through a middle of a width dimension 903 parallel to the z-axis. The first and second magnetic field sensing elements 906a, 906b can be on opposite sides of the center axis 116 and in the same plane as the center axis 116. In some embodiments, the first and second magnetic field sensing elements 906a, 906b can be equidistant from the center axis 116. In some embodiments, the center axis 116 can intersect the axis of rotation 114 of the gear 112.

As indicated by phantom lines, the substrate 904 can be disposed inside of the magnet 902.

While not shown, the magnet 902 can have an opening into which the substrate 904 is inserted to achieve the substrate 904 inside of the magnet 902.

The first and second magnetic field sensing elements 906a, 906b can have respective maximum response axes parallel to the major surface 904a of the substrate 904 and parallel to the y-axis. Maximum response axes of the first and second magnetic field sensing elements 906a, 906b, can be parallel to each other. In some embodiments, the maximum response axes are substantially parallel to the y-axis and to the arrows 908a, 908b.

A straight line 905 perpendicular to the major surface 902a of the substrate (i.e., out of the page) and intersecting the substrate 902, intersects the magnet 902 and does not intersect the gear 112. Furthermore, in some embodiments, the first and second magnetic field sensing elements 906a, 906b are disposed at positions such that a straight line parallel to the x-axis and passing through the first and second magnetic field sensing elements 906a, 906b does not intersect the gear 112.

In the embodiment shown, a straight line, as represented by an arrow 909 inside of the magnet 902, is indicative of a magnetic field directed between north (N) and south (S) poles 902c, 902d, respectively, of the magnet 902 and passing adjacent to the first and second magnetic field sensing elements 906a, 906b in a direction substantially parallel to the major surface 904a of the substrate 904, and is in the y-z plane as a straight line 909 of magnetic field returns to the north pole 902c of the magnet 902. In some embodiments, the straight line 909 between the north and south poles of the magnet 902 can be directed toward the gear 112.

The electronic circuit 910 is configured to generate an output signal (not shown). An exemplary electronic circuit 910 can be the same as or similar to the electronic circuit 110 of FIG. 1 and described below in conjunction with FIG. 12.

For an edge detector, the output signal, when the gear 112 is rotating, is indicative of speed of rotation of the gear 112 and also indicative of positions of edges of the gear teeth. For a tooth detector, the output signal, when the gear 112 is rotating, is indicative of speed of rotation of the gear 112 and also indicative of positions near to centers of the gear teeth or gear valleys.

The magnetic field sensor 900 uses the first and second magnetic field sensing elements 906a, 906b to generate respective first and second magnetic field signals. It should be appreciated that, for embodiments for which the first and second magnetic field sensing elements 906a, 906b have respective maximum response axes parallel to the y-axis, i.e., parallel to a magnetic direction of the magnet 902 as represented by the arrow 909, the first and second magnetic field sensing elements 906a, 906b can still have a low baseline.

The first and second magnetic field sensing elements 906a, 906b can generate a respective two magnetic field signals, and a difference of the above two magnetic field signals can result in an effect similar to a low baseline. In essence, when the first and second magnetic field sensing elements 906a, 906b experience the same magnetic field (i.e., proximate to a gear tooth or a gear valley), a differencing of the above signals results in a zero electronic signal.

Rotations indicated by the arrow 118 and tilts indicated by the arrow 120 described above in conjunction with FIG. 1 also apply to the magnetic field sensor 900.

Figures 10, 11:
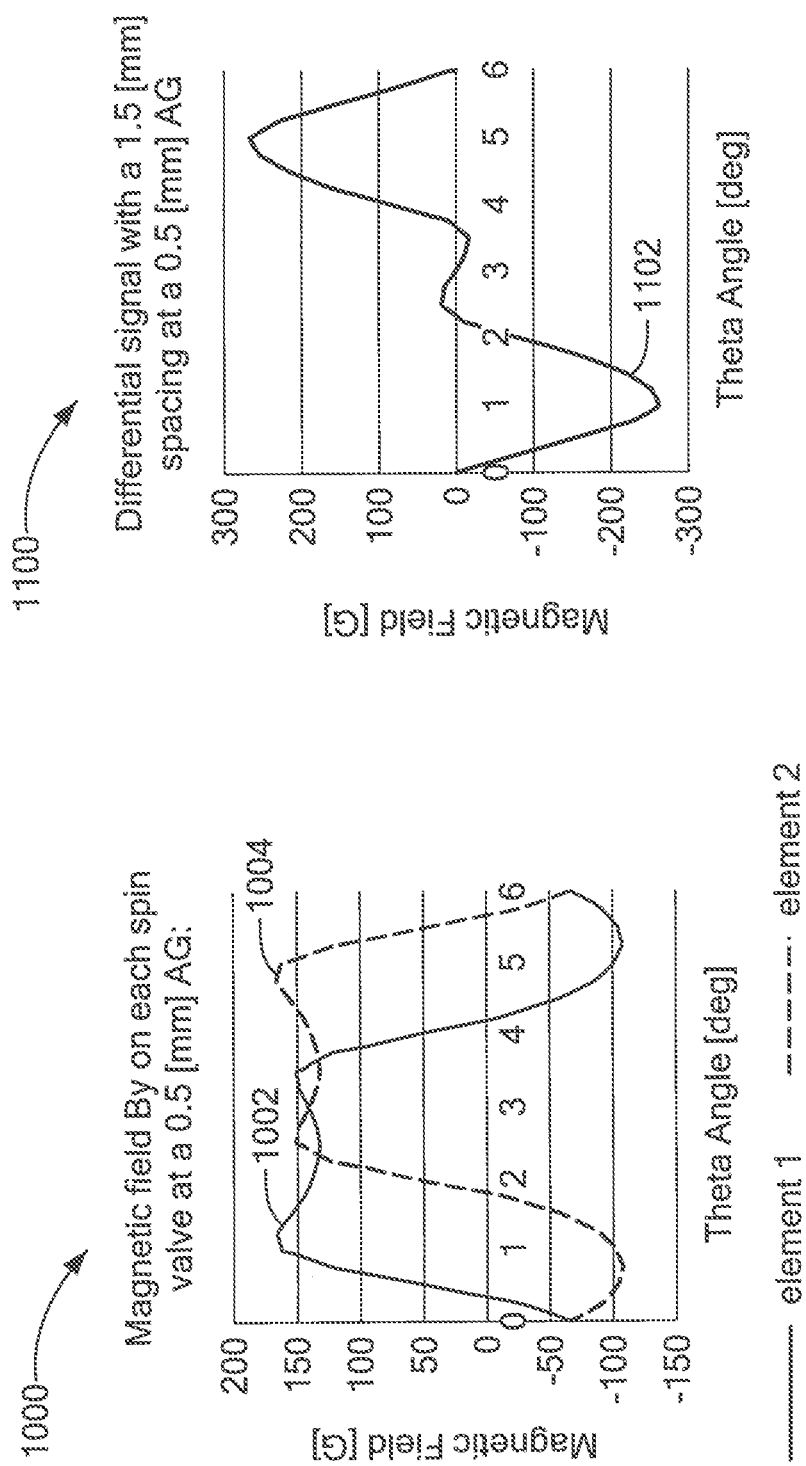
FIG. 10 is a graph showing magnetic fields experienced by the first and second magnetic field sensing elements of FIG. 9.
FIG. 11 is a graph showing a difference of magnetic fields experienced by the one or more magnetic field sensing elements of FIG. 10.

Referring now to FIG. 10, a graph 1000 includes a vertical axis with a scale in units of magnetic field in Gauss and a horizontal axis with a scale in units of angle in units of Theta, wherein a Theta of three hundred sixty is indicative of one full rotation of the gear 112 of FIGS. 1, 3, 5, 7, and 9.

A curve 1002 is indicative of a magnetic field parallel to the y-axis of FIG. 9 experienced by the first magnetic field sensing elements 906a of FIG. 9 for an air gap (AG) of about 0.5 mm as the gear 112 of FIG. 9 rotates.

A curve 1004 is indicative of a magnetic field parallel to the y-axis of FIG. 9 experienced by the second magnetic field sensing elements 906b of FIG. 9 for an air gap (AG) of about 0.5 mm as the gear 112 of FIG. 9 rotates. A spacing between two magnetic field sensing elements is about 1.5 mm.

As described above, for some magnetoresistance elements, undesirable saturation occurs at or near+/−one hundred fifty Gauss. It should be apparent that the first and second magnetic field sensing elements 906a, 906b with a maximum response axes as shown in FIG. 9, i.e., parallel to the y-axis, remain in their linear region in accordance with the curves 1002, 1004. The linear behavior can be achieved with selected design of the magnet and with selected placement of the magnetic field sensing elements.

Referring now to FIG. 11, a graph 1100 includes a vertical axis with a scale in units of magnetic field in Gauss and a horizontal axis with a scale in units of angle in units of Theta, wherein a Theta of three hundred sixty is indicative of one full rotation of the gear 112 of FIGS. 1, 3, 5, 7, and 9.

A curve 1102 is representative of a sum of signals 1002, 1004 of FIG. 10

Using a difference of signals results in the magnetic field sensor 900 being an edge detector for which peaks and valleys aligns with edges of gear teeth.

Figure 12:
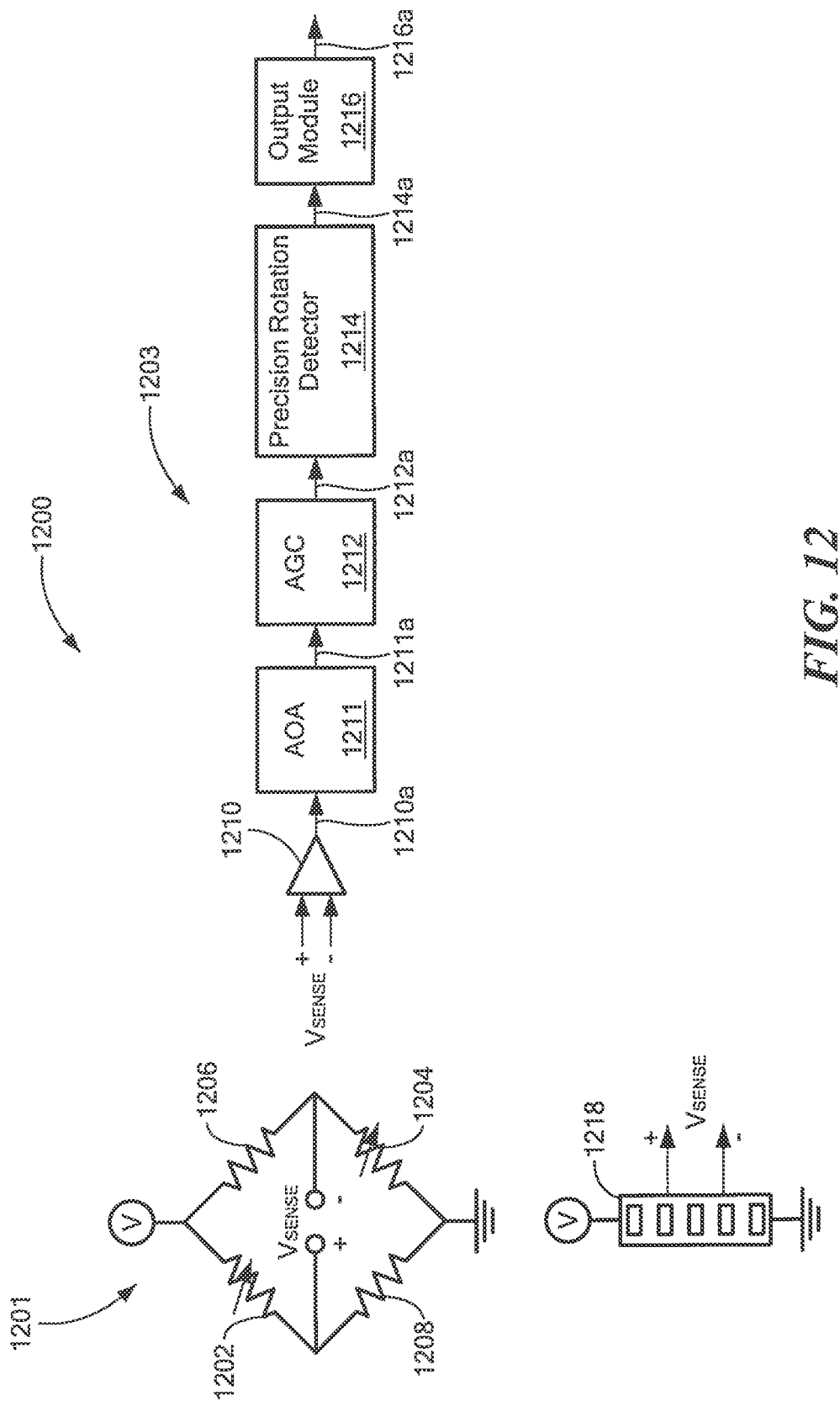
FIG. 12 is a block diagram of a magnetic field sensor showing one or more magnetoresistance elements, which can be the same as or similar to the above-described one or more magnetic field sensing elements or the above-described first and second magnetic field sensing elements, which can be the same as or similar to the above-described one or more magnetic field sensing elements or the above-described first and second magnetic field sensing elements, which can be coupled to an electronic circuit, which can be the same as or similar to the electronic circuits described above.

Referring now to FIG. 12, a magnetic field sensor 1200 can include an electronic circuit 1203, which can be the same as or similar to the electronic circuit 110 of FIGS. 1, 3, 5, 7, and 9. The magnetic field sensor 1200 can also include one or more magnetic field sensing elements 1201, which can the same as or similar to the one or more magnetic field sensing elements 106, 306, 506, 706, or the first and second magnetic field sensing element s 906a, 906b of FIGS. 1, 3, 5, 7, and 9, respectively.

In a non-limiting example, the one or more magnetic field sensing elements 1201 can include a first magnetoresistance elements 1202 and a second magnetoresistance element 1204 coupled with fixed resistors 1206, 1208 in a bridge arrangement to generate a differential voltage, Vsense. It should be appreciated that, in other embodiments, the bridge can include one, two, three, or four magnetoresistance elements and three, two, one or zero fixed resistors, respectively.

In operation, when the gear 112 rotates, the differential signal, Vsense, is an AC signal with periods related to passing gear teeth and with a frequency related to a rate at which the gear teeth pass by the magnetic field sensor 1200.

The electronic circuit 1200 can include a differential amplifier 1210 coupled to the differential signal, Vsense, and can be operable to generate an amplified signal 1210a.

An automatic offset adjust circuit 1211 can be coupled to the amplified signal 1210a and can be operable to generate an offset-controlled signal 1211a.

An automatic gain control circuit 1212 can be coupled to the amplified signal 1210a and can be operable to generate a gain-controlled signal 1212a.

A precision rotation detector 1214 can be coupled to the gain-controlled signal and can be operable to generate a rotation signal 1214a.

An output module 1216 can be coupled to the rotation signal 1214a and can be operable to generate a formatted rotation signal 1216a.

There are numerous types of precision rotation detectors, which generally fall into two categories, which are threshold detectors and peak detectors.

In general, a threshold detector identifies one or more thresholds based upon one or more percentage of a peak-to-peak range of the gain-controlled signal. With a comparison circuit (e.g., a comparator), the threshold detector compares the gain-controlled signal 1212a with the one or more thresholds to generate the rotation signal 1214a as a two state binary signal. High states of the two-state binary signal can be indicative of gear teeth or gear tooth edges, for example, associated with the gear 112, passing by the above described magnetic field sensors. Low states of the two-state binary signal can be indicative of gear valleys or gear valley edges, for example, associated with the gear 112, passing by the above described magnetic field sensors. An example of a threshold detector is described in U.S. Pat. No. 6,525,531, entitled "Detection of Passing Magnetic Articles while Adapting the Detection Threshold," issued Feb. 25, 2003, which is incorporated by reference herein in its entirety. However, other forms of threshold detectors are also known.

In general, a peak detector identifies one or more thresholds based upon fixed separations, e.g., fifty millivolts, from positive peaks and negative peaks of the gain-controlled signal. With a comparison circuit, the peak detector compares the gain-controlled signal 1212a with the one or more thresholds to generate the rotation signal as a two state binary signal similar to the two-state binary signal described above. An example of a peak detector is described in U.S. Pat. No. 7,368,904, entitled "Proximity Detector," issued May 6, 2008, which is incorporated by reference herein in its entirety. However, other forms of peak detectors are also known.

In operation, the output module 1216 can reformat the two-state binary signal rotation signal 1214a to one of many different forms, for example, a SENT format, and I2C format, a PWM format, or other.

In other embodiments, instead of the magnetoresistance element bridge 1201, the magnetic field sensor 1200 can include one or more vertical Hall elements, for example, one vertical Hall element 1218, which can the same as or similar to the one or more magnetic field sensing elements 106, 306, 506, 706, or the first and second magnetic field sensing elements 906a, 906b of FIGS. 1, 3, 5, 7, and 9, respectively. The vertical Hall element 1218 can generate a differential magnetic field signal, Vsense, which can be coupled to the differential amplifier 1210.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor for measuring movement of a ferromagnetic object, the movement in an x-y plane within x-y-z Cartesian coordinates with x, y, and z orthogonal axes, a direction of movement of a surface of the ferromagnetic object proximate to the magnetic field sensor in a direction parallel to the x axis, the magnetic field sensor comprising:
   a substrate having a major planar surface within forty-five degrees of parallel to the x-y plane;
   a magnet disposed proximate to the substrate, the magnet having at least two poles to generate a magnetic field parallel to the major planar surface of the substrate, wherein the substrate is disposed between the magnet and the ferromagnetic object, and wherein a straight line perpendicular to the major planar surface of the substrate does not intersect the ferromagnetic object and does not intersect the magnet; and
   one or more magnetic field sensing elements disposed upon the major planar surface of the substrate, the one or more magnetic field sensing elements having respective major response axes parallel to the x-axis, the one or more magnetic field sensing elements configured to generate one or more respective magnetic field signals.

2. The magnetic field sensor of claim 1, wherein the one or more magnetic field sensing elements are disposed at a position relative to the magnet such that, in the presence of no ferromagnetic object, a magnetic field experienced by the one or more magnetic field sensing elements is below a saturation level of the one or more magnetic field sensing elements.

3. The magnetic field sensor of claim 2, wherein the one or more magnetic field sensing elements comprise one or more respective magnetoresistance element.

4. The magnetic field sensor of claim 2, wherein the one or more magnetic field sensing elements comprise one or more respective vertical Hall Effect elements.

5. The magnetic field sensor of claim 2, wherein the magnet consists of one uniform material.

6. The magnetic field sensor of claim 1, wherein the one or more magnetic field sensing elements comprise a plurality of magnetic field sensing elements for generating a respective plurality of magnetic field signals, the magnetic field sensor further comprising:
   a differential amplifier coupled to receive signals representative of selected ones of the plurality of magnetic field signals and configured to generate a difference signal.

7. The magnetic field sensor of claim 1, wherein the straight line perpendicular to the major planar surface of the substrate passes through a center of the major planar surface of the substrate.

8. The magnetic field sensor of claim 1, wherein all straight lines perpendicular to the major planar surface of the substrate do not intersect the ferromagnetic object and do not intersect the magnet.

9. A magnetic field sensor for measuring movement of a ferromagnetic object, the movement in an x-y plane within x-y-z Cartesian coordinates with x, y, and z orthogonal axes, a direction of movement of a surface of the ferromagnetic object proximate to the magnetic field sensor in a direction parallel to the x axis, the magnetic field sensor comprising:
   a substrate having a major planar surface within forty-five degrees of parallel to the x-y plane;
   a magnet disposed proximate to the substrate, the magnet having at least two poles to generate a magnetic field parallel to the major planar surface of the substrate, the magnet comprising a cavity therein, wherein the substrate is disposed within the cavity, and wherein a straight line perpendicular to the major planar surface of the substrate does not intersect the ferromagnetic object but does intersect the magnet; and
   one or more magnetic field sensing elements disposed upon the major planar surface of the substrate, the one or more magnetic field sensing elements having respective one or more major response axes parallel to the x-axis or parallel to the y-axis, the one or more magnetic field sensing elements configured to generate one or more respective magnetic field signals.

10. The magnetic field sensor of claim 9, wherein the one or more magnetic field sensing elements have respective major response axes parallel to the x-axis, and wherein the one or more magnetic field sensing elements are disposed at a position within the magnet such that, in the presence of no ferromagnetic object, a magnetic field experienced by the one or more magnetic field sensing elements is below a saturation level of the one or more magnetic field sensing elements.

11. The magnetic field sensor of claim 9, wherein the one or more magnetic field sensing elements comprise one or more respective magnetoresistance elements.

12. The magnetic field sensor of claim 9, wherein the one or more magnetic field sensing elements comprise one or more respective vertical Hall Effect elements.

13. The magnetic field sensor of claim 9, wherein the ferromagnetic object comprises a ferromagnetic tooth of a gear configured to rotate.

14. The magnetic field sensor of claim 9, wherein the one or more magnetic field sensing elements have respective a major response axes parallel to the y-axis, and wherein the one or more magnetic field sensing elements are disposed at a position within the magnet such that, in the presence of no ferromagnetic object, a magnetic field experienced by the one or more magnetic field sensing elements is below a saturation level of the one or more magnetic field sensing elements.

15. The magnetic field sensor of claim 14, wherein the one or more magnetic field sensing elements comprises one or more respective magnetoresistance elements.

16. The magnetic field sensor of claim 14, wherein the one or more magnetic field sensing elements comprises one or more respective vertical Hall Effect elements.

17. The magnetic field sensor of claim 14, wherein the magnet consists of one uniform material.

18. The magnetic field sensor of claim 9, wherein the one or more magnetic field sensing elements comprise a plurality of magnetic field sensing elements for generating a respective plurality of magnetic field signals, the magnetic field sensor further comprising:

a differential amplifier coupled to receive signals representative of selected ones of the plurality of magnetic field signals and configured to generate a difference signal.

19. The magnetic field sensor of claim 9, wherein the straight line perpendicular to the major planar surface of the substrate passes through a center of the major planar surface of the substrate.

20. The magnetic field sensor of claim 9, wherein all straight lines perpendicular to the major planar surface of the substrate do not intersect the ferromagnetic object.

21. The magnetic field sensor of claim 9, wherein all straight lines perpendicular to the major planar surface of the substrate do not intersect the ferromagnetic object but do intersect the magnet.

22. A magnetic field sensor for measuring movement of a ferromagnetic object, the movement in an x-y plane within x-y-z Cartesian coordinates with x, y, and z orthogonal axes, a direction of movement of a surface of the ferromagnetic object proximate to the magnetic field sensor in a direction parallel to the x axis, the magnetic field sensor comprising:

a substrate having a major planar surface within forty-five degrees of parallel to the x-y plane;

a magnet disposed proximate to the substrate, the magnet having at least two poles to generate a magnetic field parallel to the major planar surface of the substrate, the magnet comprising a cavity therein, wherein the substrate is disposed within the cavity, and wherein a straight line perpendicular to the major planar surface of the substrate does not intersect the ferromagnetic object; and first and second magnetic field sensing elements disposed upon the major planar surface of the substrate, the first and second magnetic field sensing elements having respective major response axes parallel to the x-axis or parallel to the y-axis the first and second magnetic field sensing elements configured to generate first and second magnetic field signals, respectively, wherein a straight line intersecting the first and second magnetic field sensing elements does not intersect the ferromagnetic object.

23. The magnetic field sensor of claim 22, further comprising:

a differential amplifier coupled to receive signals representative of the first and second magnetic field signals and configured to generate a difference signal.

24. The magnetic field sensor of claim 22, wherein the first and second magnetic field sensing elements are disposed at positions within the magnet such that, in the presence of no ferromagnetic object, magnetic fields experienced by the first and second magnetic field sensing elements are below saturation respective levels of the first and second magnetic field sensing elements.

25. The magnetic field sensor of claim 22, wherein the first and second magnetic field sensing elements comprise first and second magnetoresistance elements.

26. The magnetic field sensor of claim 22, wherein the first and second magnetic field sensing elements comprise first and second vertical Hall elements.

27. The magnetic field sensor of claim 22, wherein the magnet consists of one uniform material.

28. The magnetic field sensor of claim 22, wherein the first and second magnetic field sensing elements are disposed on opposite sides of a straight line parallel to the first surface of the substrate and intersecting first and second surfaces of the magnet having respective north and south poles of the magnet.

29. The magnetic field sensor of claim 28, wherein the first and second magnetic field sensing elements are disposed at positions equidistant from the straight line parallel to the first surface of the substrate and intersecting first and second surfaces of the magnet having respective north and south poles of the magnet.

30. The magnetic field sensor of claim 22, wherein the straight line perpendicular to the major planar surface of the substrate passes through a center of the major planar surface of the substrate.

31. The magnetic field sensor of claim 22, wherein all straight lines perpendicular to the major planar surface of the substrate do not intersect the ferromagnetic object.

32. The magnetic field sensor of claim 22, wherein all straight lines perpendicular to the major planar surface of the substrate do not intersect the ferromagnetic object but do intersect the magnet.

* * * * *

UNITED STATES PATENT AND TRADEMARK OFFICE
CERTIFICATE OF CORRECTION

PATENT NO. : 11,022,464 B2
APPLICATION NO. : 16/157130
DATED : June 1, 2021
INVENTOR(S) : Friedrich et al.

It is certified that error appears in the above-identified patent and that said Letters Patent is hereby corrected as shown below:

In the Specification

Column 1, Line 39 delete "element" and replace with --elements--.

Column 2, Line 52 delete "it" and replace with --in--.

Column 3, Line 50 delete "a one" and replace with --one--.

Column 9, Line 60 delete ", it assumed" and replace with --, it is assumed--.

Column 10, Line 37 delete ", gear the teeth" and replace with --, gear teeth--.

Column 15, Line 7 delete "and" and replace with --an--.

Column 15, Line 11 delete "values represent" and replace with --values that represent--.

Column 17, Line 31 delete "values represent" and replace with --values that represent--.

Column 17, Line 50 delete ", gear the teeth" and replace with --, gear teeth--.

Column 20, Line 5 delete "FIG. 10" and replace with --FIG. 10.--.

Column 20, Line 8 delete "aligns" and replace with --align--.

Column 20, Line 14 delete "can the" and replace with --can be the--.

Column 20, Line 16 delete "element s" and replace with --elements--.

Column 21, Line 16 delete "or other." and replace with --or other format.--.

Signed and Sealed this
Thirty-first Day of May, 2022

Katherine Kelly Vidal
*Director of the United States Patent and Trademark Office*

Column 21, Line 20 delete "can the" and replace with --can be the--.

In the Claims

Column 22, Line 10 delete "element." and replace with --elements.--.

Column 23, Lines 8-9 delete "respective a major" and replace with --respective major--.